Aug. 1, 1933.  A. J. LEWIS ET AL  1,920,264
VALVE PIN WASHER AND FERRULE MAKER AND ASSEMBLER
Filed Aug. 3, 1929   17 Sheets-Sheet 1
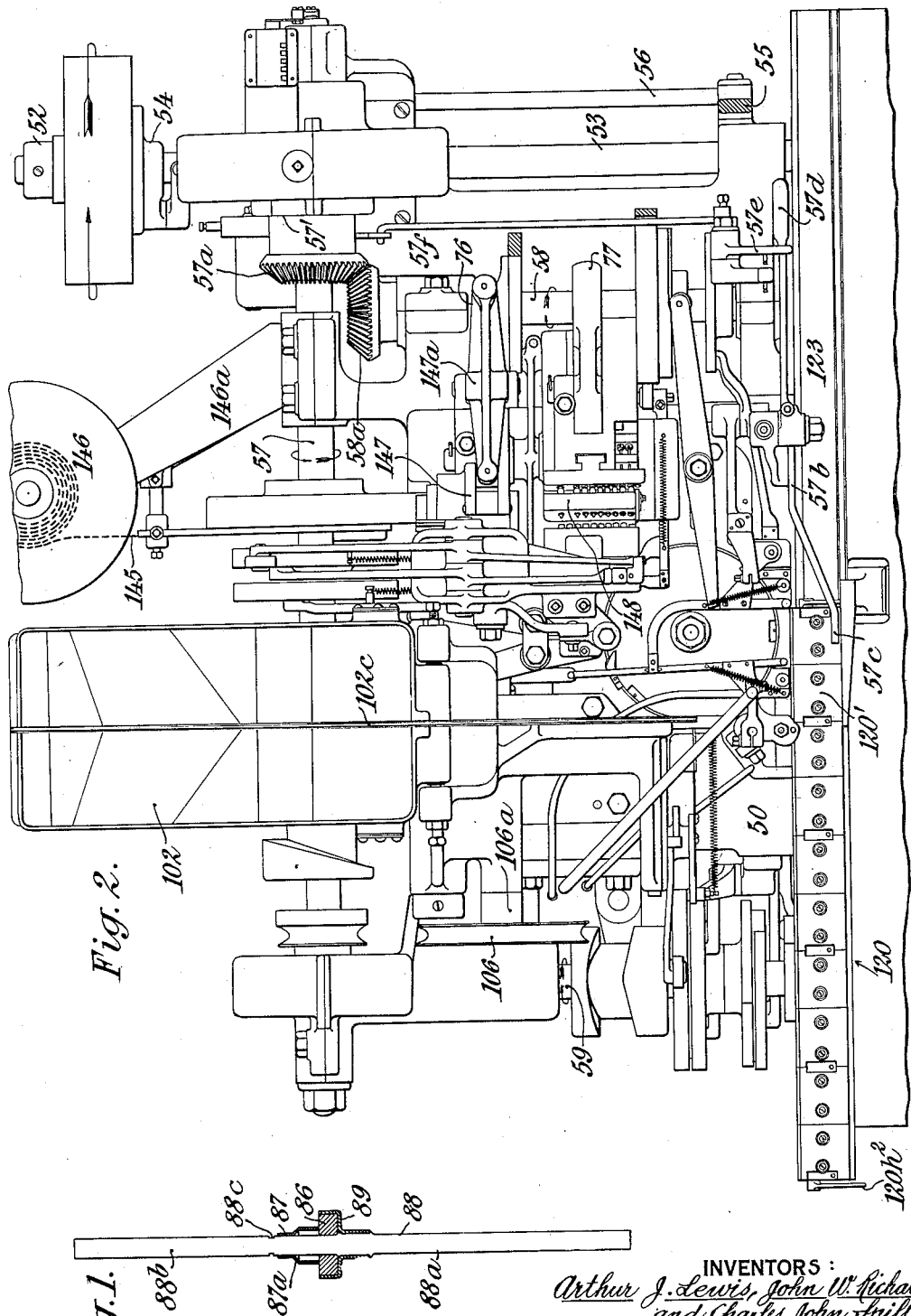
INVENTORS:
Arthur J. Lewis, John W. Richardson
and Charles John Spill.
Fraser, Myers & Manley
ATTORNEYS.

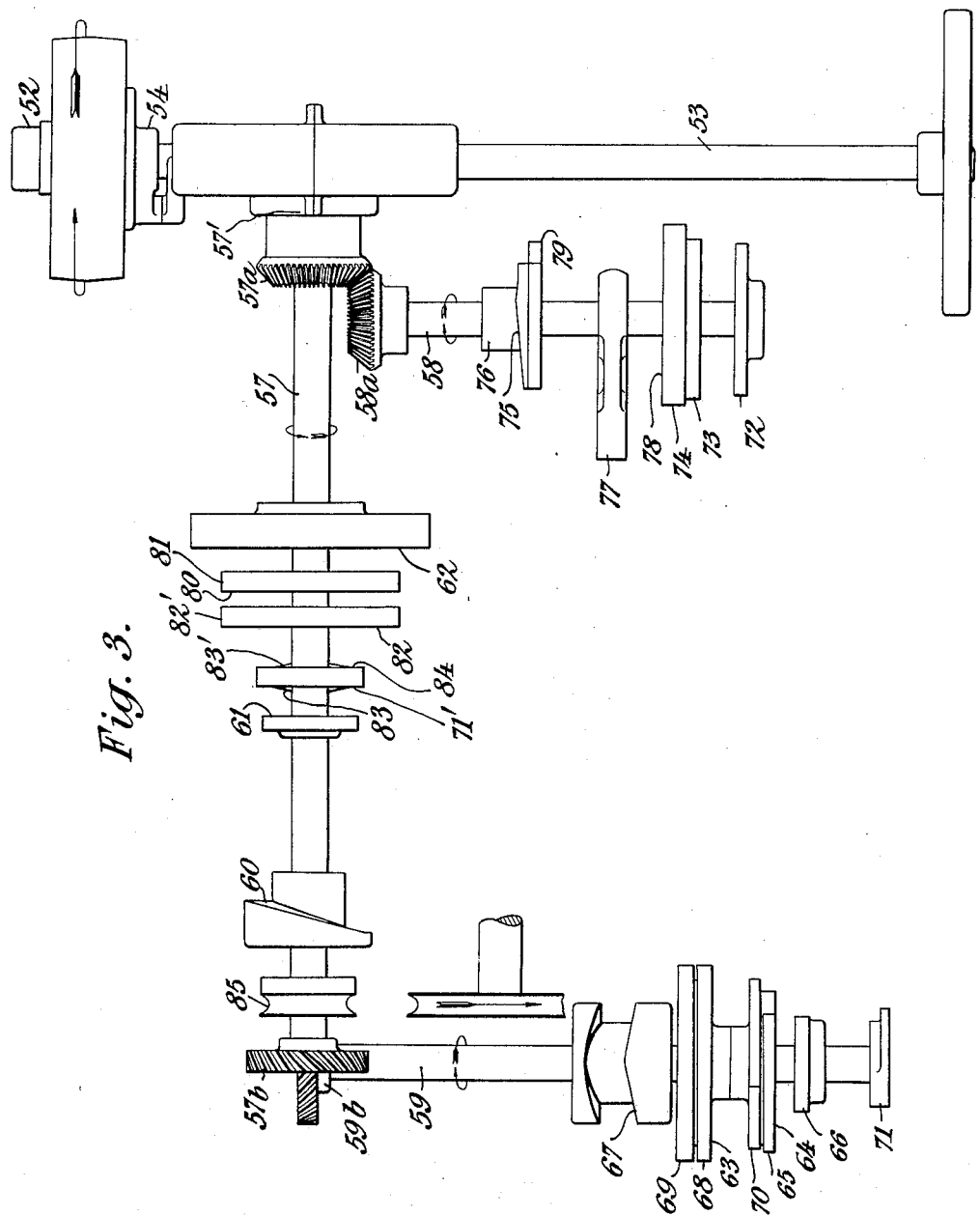

Aug. 1, 1933.  A. J. LEWIS ET AL  1,920,264
VALVE PIN WASHER AND FERRULE MAKER AND ASSEMBLER
Filed Aug. 3, 1929  17 Sheets-Sheet 3

INVENTORS:
Arthur J. Lewis, John W. Richardson
and Charles John Spill,
Fraser, Myers & Manley
ATTORNEYS

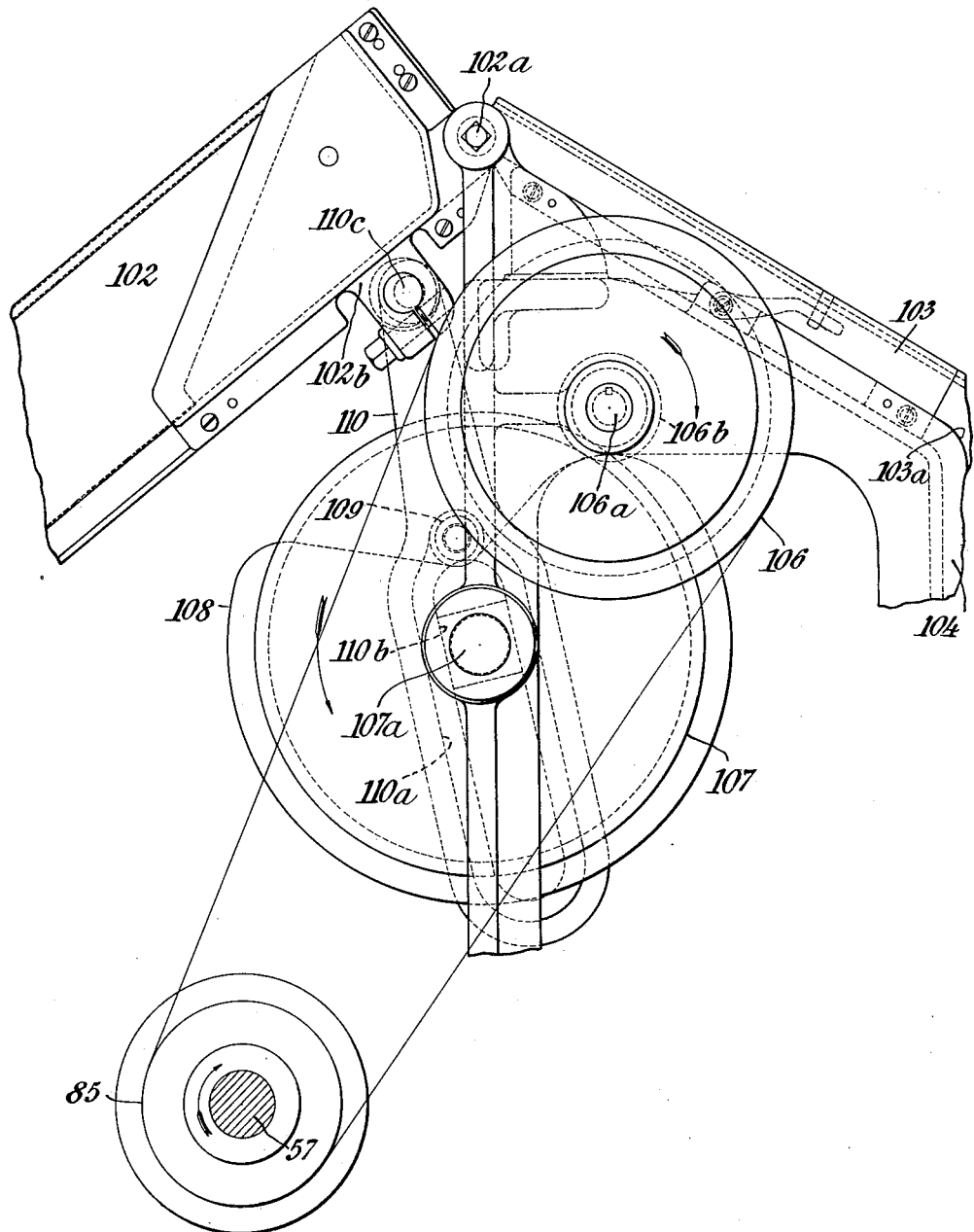

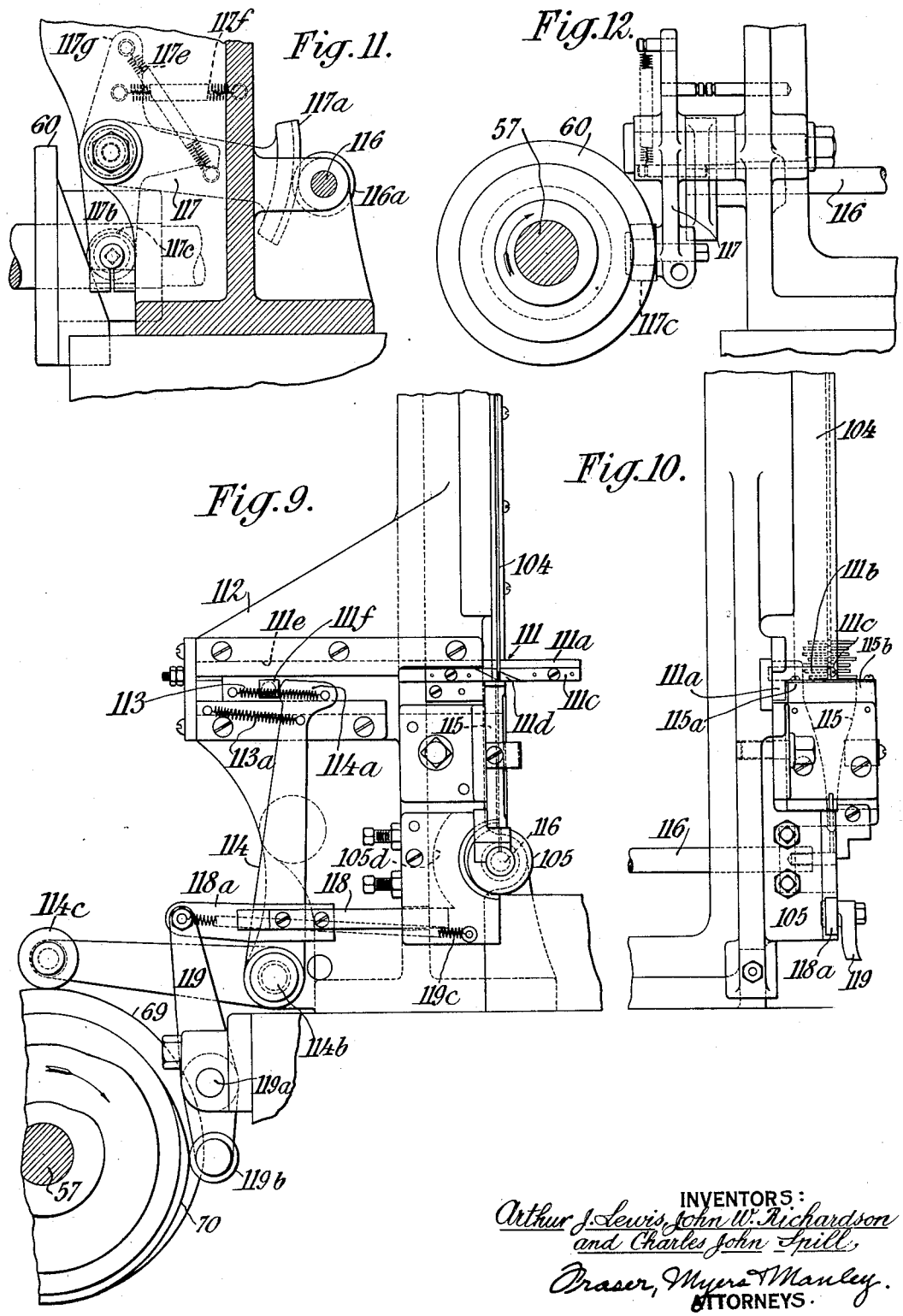

Aug. 1, 1933.   A. J. LEWIS ET AL   1,920,264
VALVE PIN WASHER AND FERRULE MAKER AND ASSEMBLER
Filed Aug. 3, 1929    17 Sheets-Sheet 7

INVENTORS:
Arthur J. Lewis, John W. Richardson
and Charles John Spill
By Attorneys,
Fraser, Myers & Manley Aug. 1, 1933.   A. J. LEWIS ET AL   1,920,264
VALVE PIN WASHER AND FERRULE MAKER AND ASSEMBLER
Filed Aug. 3, 1929   17 Sheets-Sheet 8

INVENTORS:
Arthur J. Lewis, John W. Richardson.
and Charles John Spill,
Fraser, Myers & Manley.
ATTORNEYS.

Aug. 1, 1933.  A. J. LEWIS ET AL  1,920,264
VALVE PIN WASHER AND FERRULE MAKER AND ASSEMBLER
Filed Aug. 3, 1929   17 Sheets-Sheet 9

INVENTORS:
Arthur J. Lewis, John W. Richardson
and Charles John Spill,
Fraser, Myers & Manley
ATTORNEYS Aug. 1, 1933.  A. J. LEWIS ET AL  1,920,264
VALVE PIN WASHER AND FERRULE MAKER AND ASSEMBLER
Filed Aug. 3, 1929    17 Sheets-Sheet 10
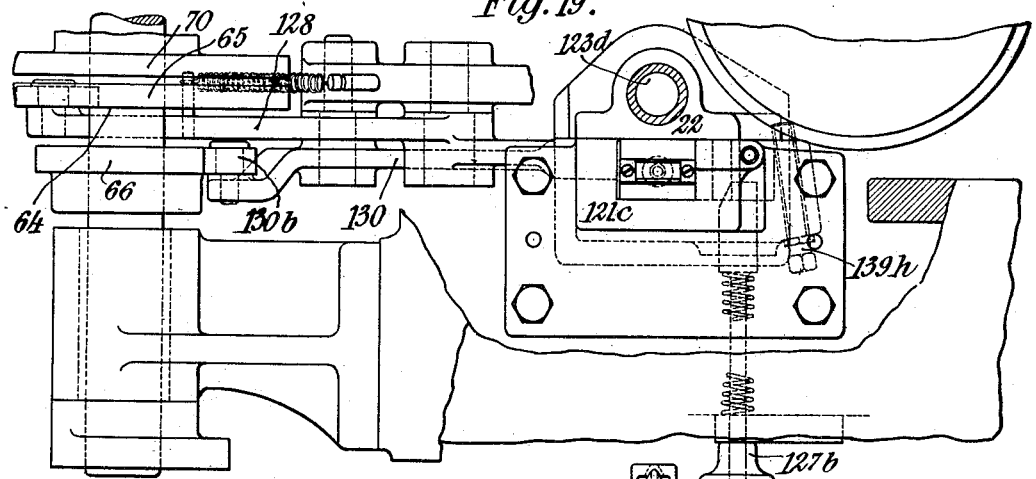
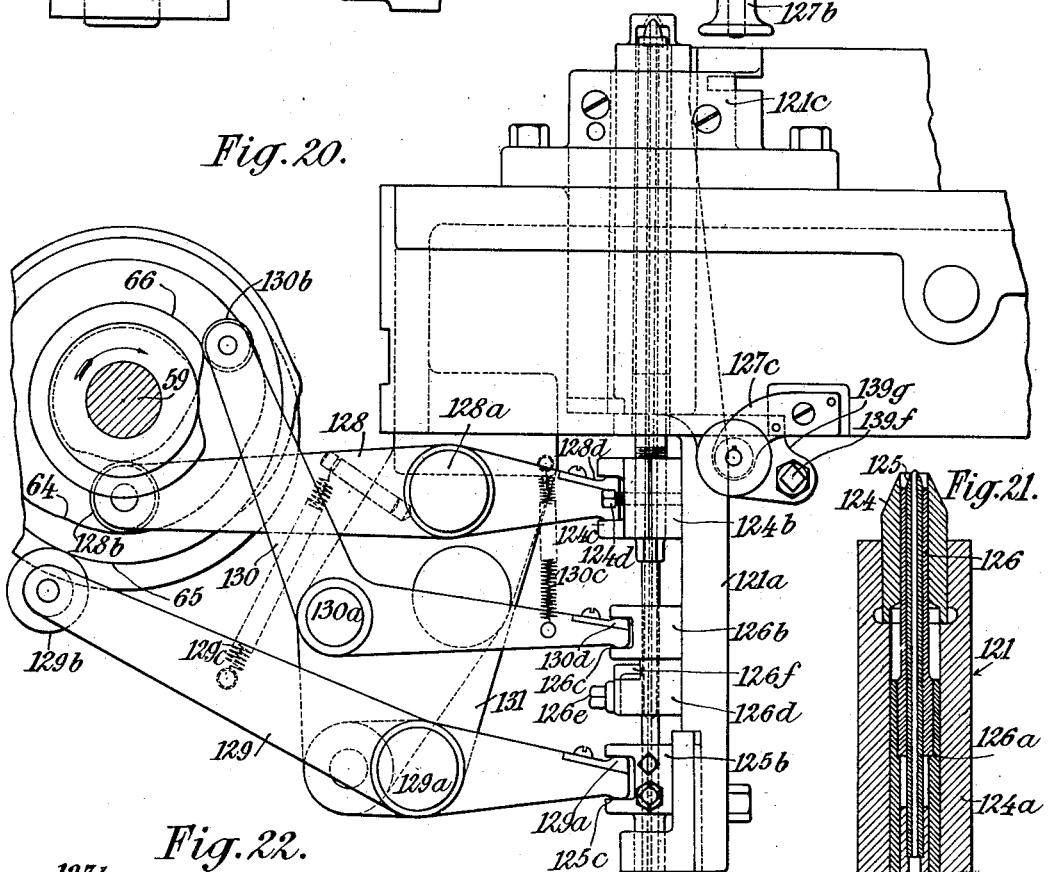
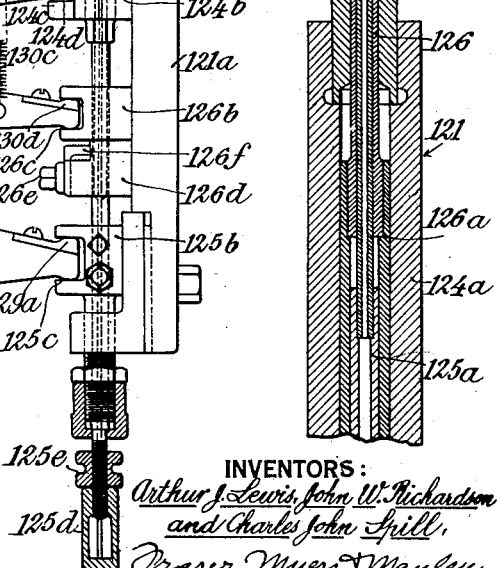
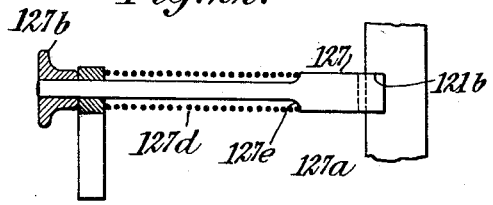
INVENTORS:
Arthur J. Lewis, John W. Richardson
and Charles John Spill.
Fraser, Myers & Manley
ATTORNEYS.

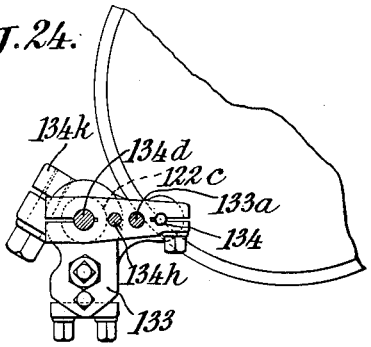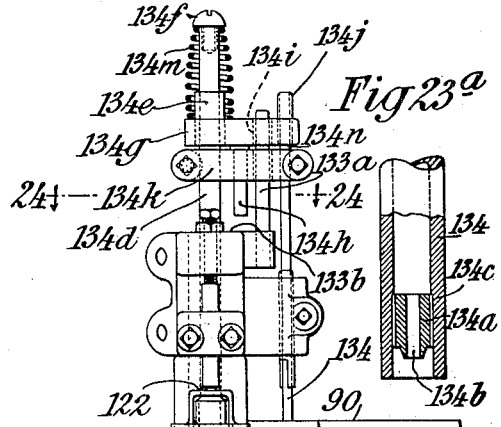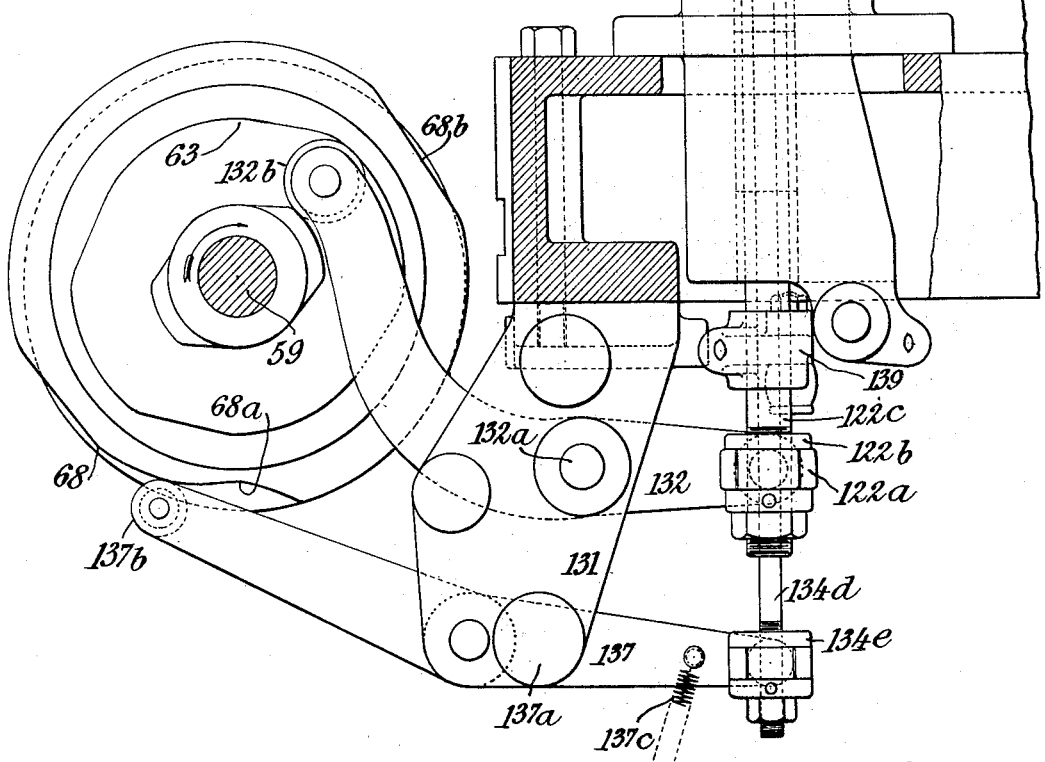

Aug. 1, 1933.  A. J. LEWIS ET AL  1,920,264
VALVE PIN WASHER AND FERRULE MAKER AND ASSEMBLER
Filed Aug. 3, 1929  17 Sheets-Sheet 12

Aug. 1, 1933.  A. J. LEWIS ET AL  1,920,264
VALVE PIN WASHER AND FERRULE MAKER AND ASSEMBLER
Filed Aug. 3, 1929   17 Sheets-Sheet 13

INVENTORS
Arthur J. Lewis, John W. Richardson
and Charles John Spill,
Fraser, Myers & Manley.
ATTORNEYS.

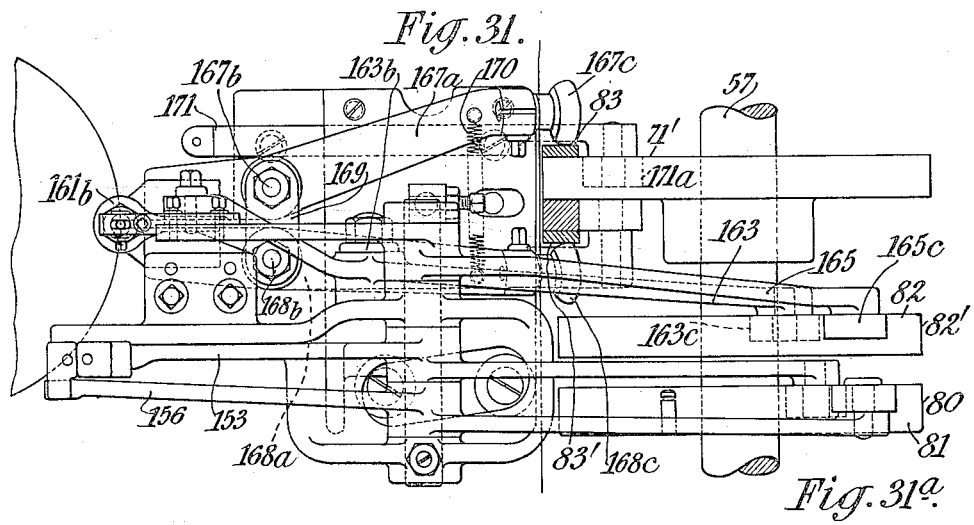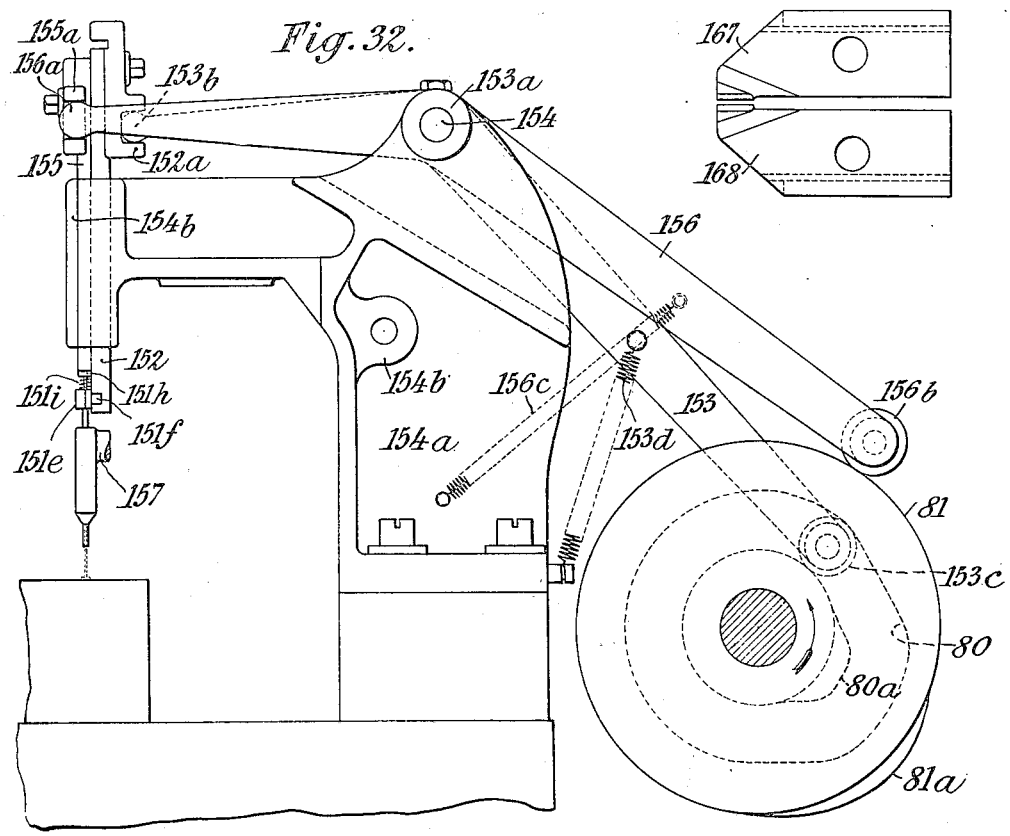

Aug. 1, 1933.  A. J. LEWIS ET AL  1,920,264
VALVE PIN WASHER AND FERRULE MAKER AND ASSEMBLER
Filed Aug. 3, 1929  17 Sheets-Sheet 15
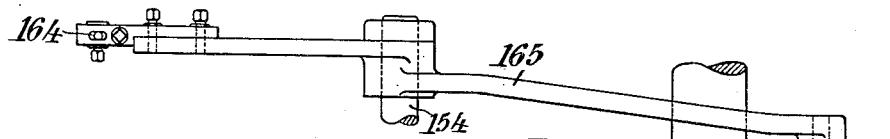
*Fig.33.ª*
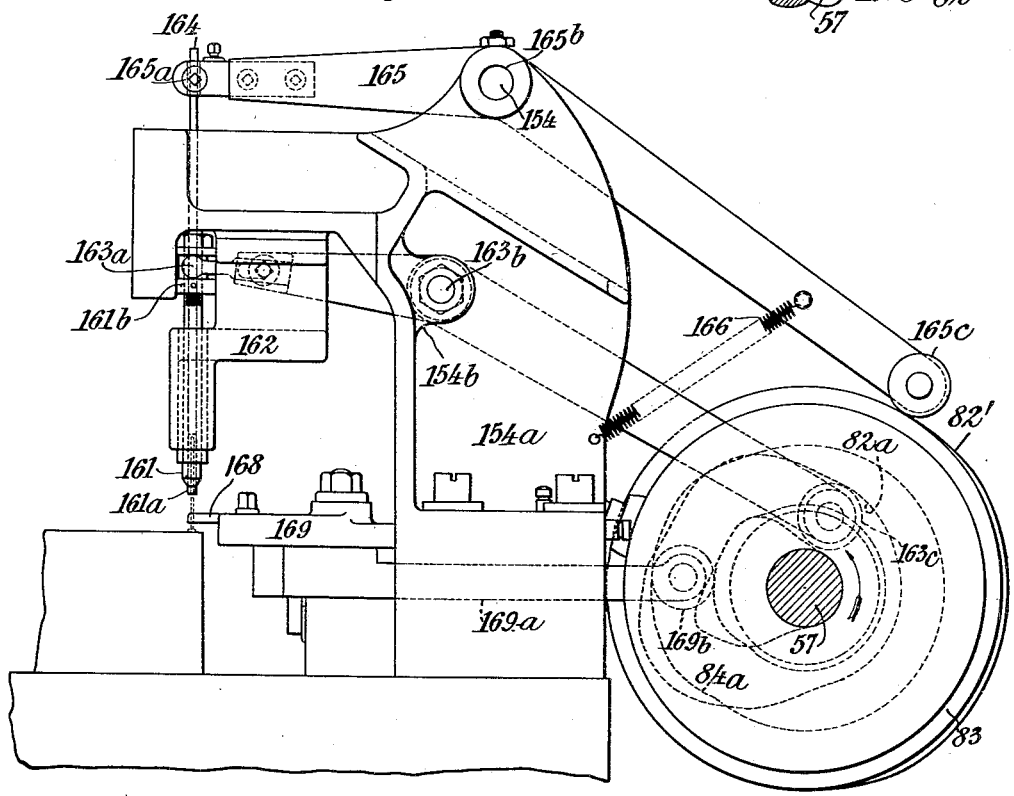
*Fig.33.*
INVENTORS:
Arthur J. Lewis, John W. Richardson
and Charles John Spill.
Fraser, Myers & Manley.
ATTORNEYS.

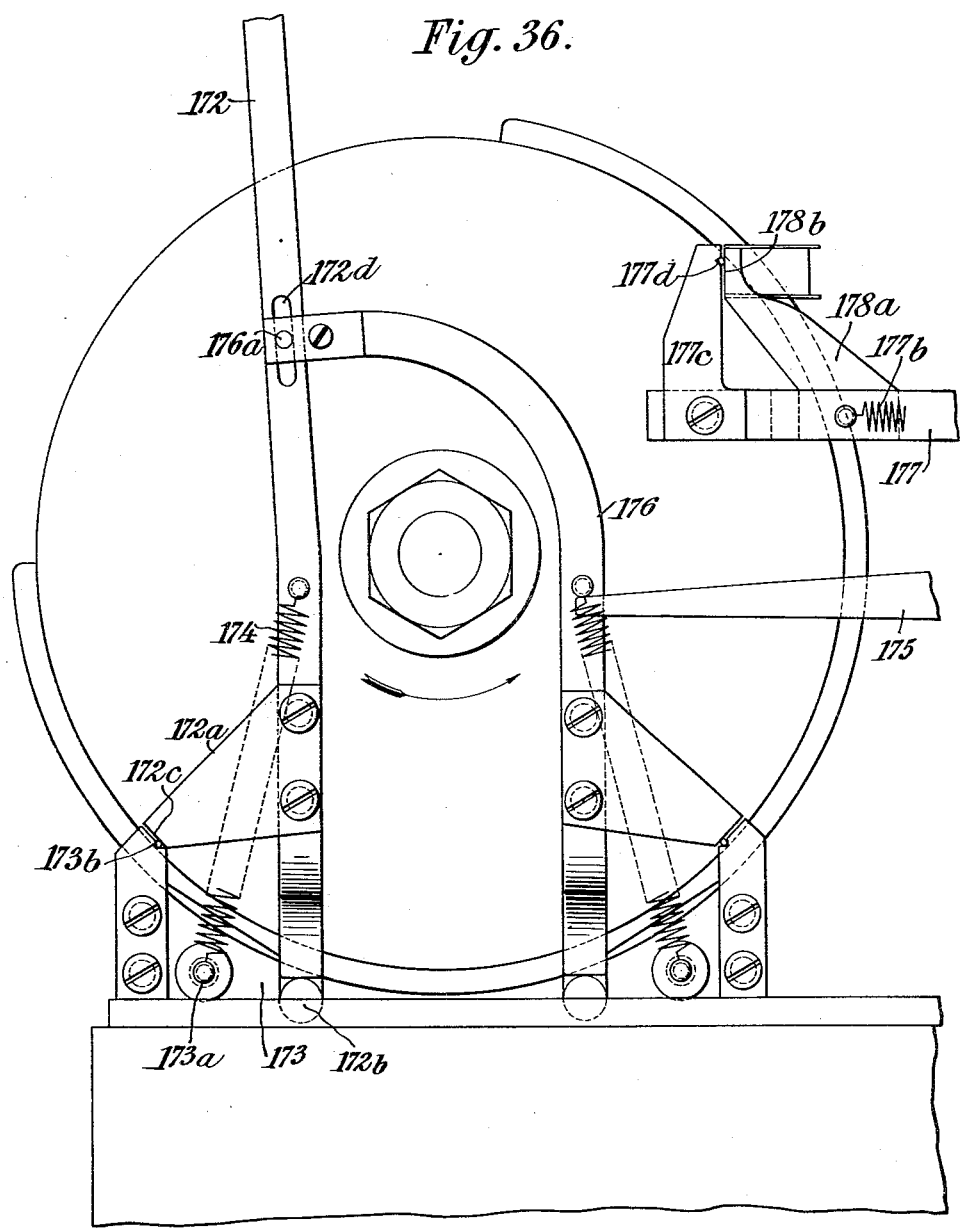

Aug. 1, 1933.  A. J. LEWIS ET AL  1,920,264
VALVE PIN WASHER AND FERRULE MAKER AND ASSEMBLER
Filed Aug. 3, 1929    17 Sheets-Sheet 17

INVENTORS:
Arthur J. Lewis, John W. Richardson
and Charles John Spill,
Fraser, Myers & Manley
ATTORNEYS.

Patented Aug. 1, 1933

1,920,264

UNITED STATES PATENT OFFICE 1,920,264

VALVE PIN WASHER AND FERRULE MAKER AND ASSEMBLER

Arthur J. Lewis and John W. Richardson, Stratford, Conn., and Charles John Spill, Garden City, N. Y., assignors to A. Schrader's Son, Inc., Brooklyn, N. Y., a Corporation of New York Application August 3, 1929. Serial No. 383,398

30 Claims. (Cl. 29—33.)

This invention relates to a machine for making the valve washer and the ferrule of a pneumatic tire valve inside and for assembling said parts upon a valve pin which is provided with a washer support or plunger cup.

In the manufacture of tire valve insides of the type to which the present invention is directed as heretofore carried out, the valve washer and the ferrule were made on separate machines and were assembled on the valve pin through the intervention of both human and mechanical agencies. Although these operations were conducted with a high degree of efficiency, it was recognized that the handling of the small elements by the human fingers was both tedious and trying on the operators, and also proved to be the largest item in the manufacturing cost.

To overcome the foregoing objections we have provided a machine in which the various operations of making the washer and the ferrule, and assembling said parts upon the valve pin are carried out automatically in a continuous operation.

According to the present invention we provide a machine having a plurality of instrumentalities, by means of which a valve pin having a washer support assembled thereon is fed to an intermittently movable conveyor having a plurality of recesses to receive said pins, which, in turn, are successively conducted to a plurality of stations whereat the following operations are automatically performed with respect to or upon the fed valve pins: A valve washer is blanked out of sheet rubber; the washer is applied upon the pin; the washer tucked or tamped down into the washer-holding cup or support; a ferrule is formed and applied upon the pin and pushed down into contact with the washer; the pin is swaged to hold the ferrule in place thereon and the elements as thus assembled are ejected from the machine. The cooperative relation and arrangement of the various instrumentalities are such that the aforementioned operations are carried out in succession continuously with great dispatch. The invention, it will be appreciated, also includes numerous sub-combinations and features of novelty, all of which will be apparent from the detailed description which follows.

An operative construction of our invention is embodied in the mechanism illustrated in the accompanying drawings, wherein Figure 1 is a side elevation of a valve pin with the elements assembled thereon showing in cross-section, said pin being the final product turned out by the machine of the present invention.

Fig. 2 is a top plan view of the machine.

Fig. 3 is a top plan of the arrangements by which the power is applied to the various operating mechanisms.

Fig. 8 is a side elevation of the feed hopper operating means.

Figs. 9 and 10 show a fractional front elevation and a side elevation, respectively, of the valve pin feeding means.

Figs. 11 and 12 show details of the operating mechanism for the dial inverter associated with the valve pin feeding means.

Figure 15:
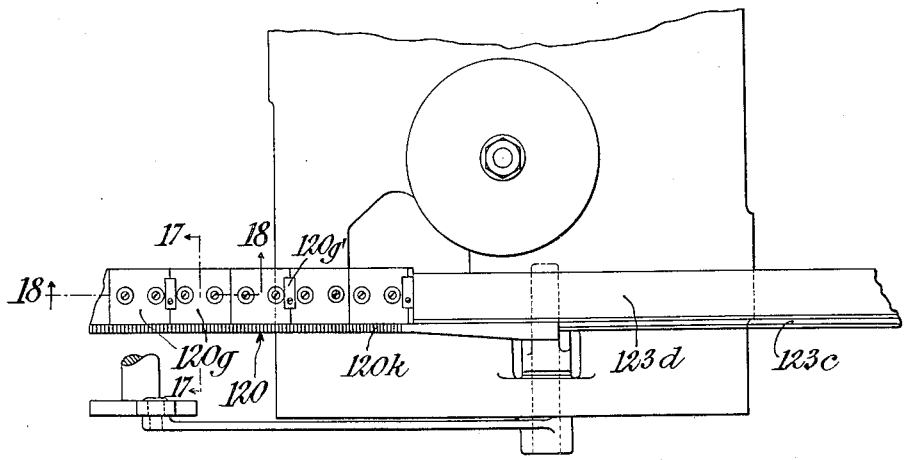
Figs. 15 and 16 are a top plan and side elevation respectively, of the mechanism for controlling the rubber feed to the washer forming means.
Figure 16:
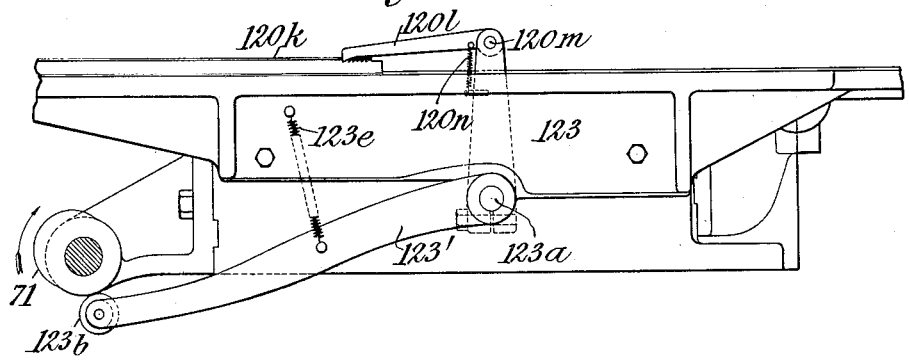
Figure 17:
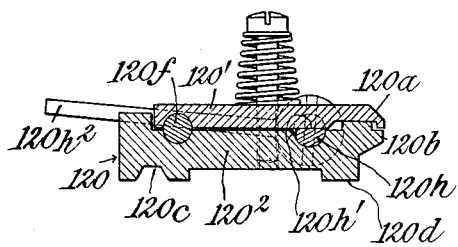
Figure 18:
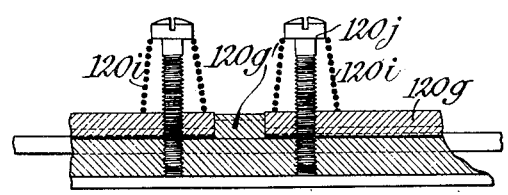

Figs. 17 and 18 are sections taken respectively along the lines 17—17 and 18—18 of Fig. 15.

Figs. 19 and 20 are a top plan view and side elevation respectively, of the operating mechanism for controlling the movements of the rubber washer forming dies.

Fig. 21 is an enlarged longitudinal section of the washer-forming punches or dies.

Fig. 22 is a sectional detail taken along the line 22—22 of Fig. 19.

Fig. 23 is an elevation partly in section of the mechanism for controlling the operation of the rubber washer anvil die and means for applying the washer upon a pin.

Fig. 23a is a sectional detail of the washer transfer tube.

Fig. 24 is a section taken substantially along the plane of the line 24—24 of Fig. 23.

Figure 25:
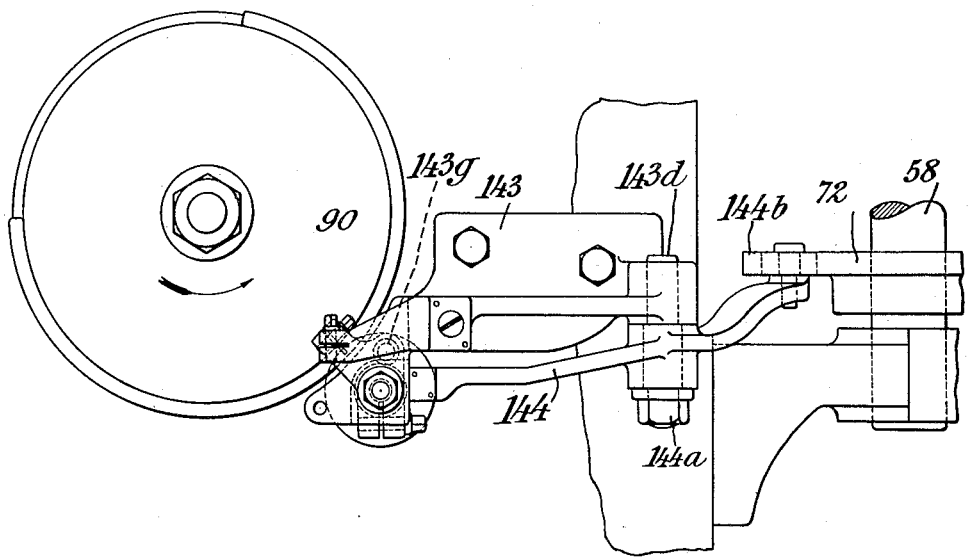
Figure 26:
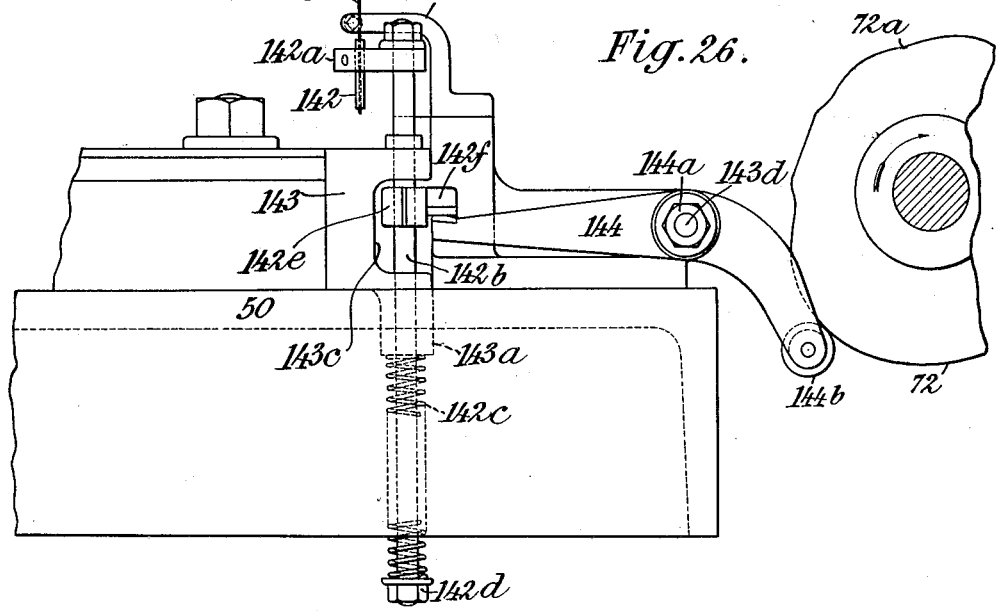

Figs. 25 and 26 are a top plan view and a side elevation respectively of the operating mechanism for controlling the tamping or tucking of the washer down upon the valve pin.

Figure 27:
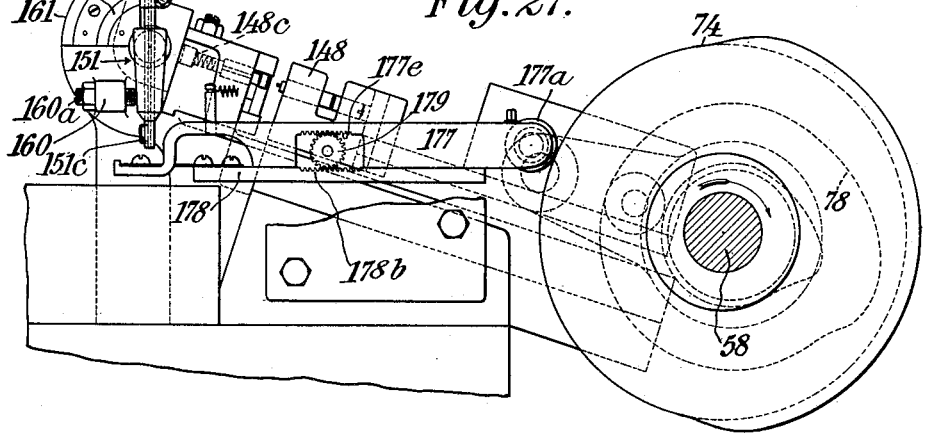

Fig. 27 is a side elevation with parts broken away, showing the operating mechanism of the ferrule transfer means and of the centering means for the pin at the ferrule transfer station.

Figure 28:
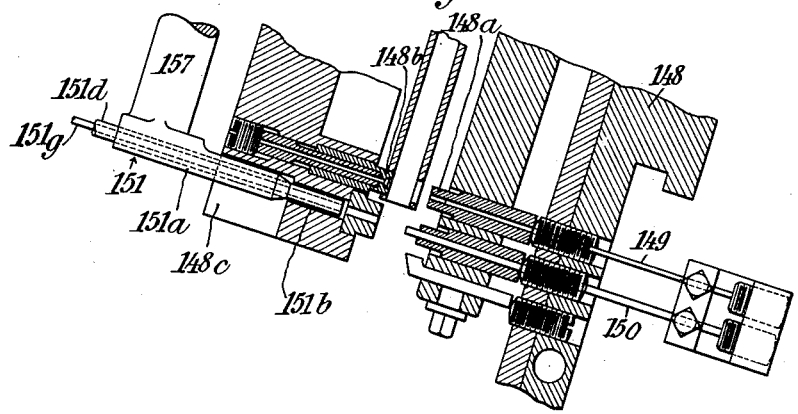

Fig. 28 is an axial section showing a detail of the ferrule-forming and ejecting means.

Figure 29:
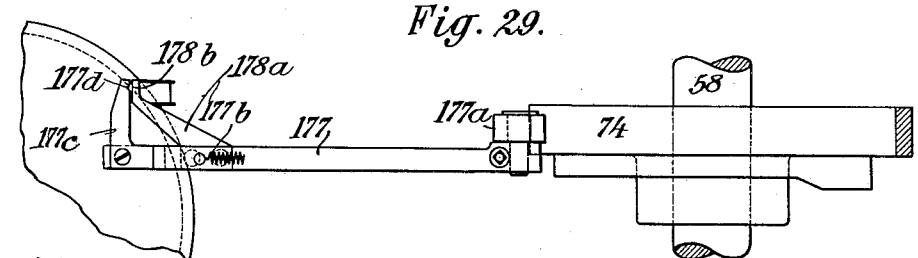

Fig. 29 is a top plan view of the pin-centering means at the ferrule transfer station.

Figure 30:
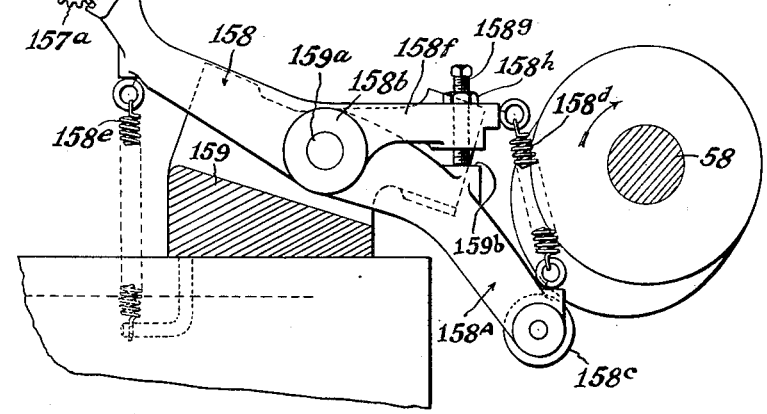

Fig. 30 is an elevation partly in section of the operating mechanism for the ferrule transfer means.

Fig. 31 is a top plan view of the operating mechanism for applying the ferrule to the pin and for swaging the pin.

Fig. 31a is a top plan of the swaging dies.

Fig. 32 is a side elevation of the operating mechanism for applying the ferrule onto the pin.

Fig. 33 is a side elevation of the operating mechanism for pushing the ferrule down upon the pin, for holding the pin and for swaging the pin.

Fig. 33a is a top plan of the pin-holding operating mechanism.

Figure 34:
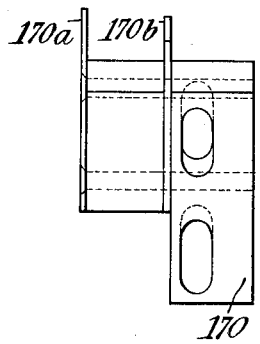
Figure 35:
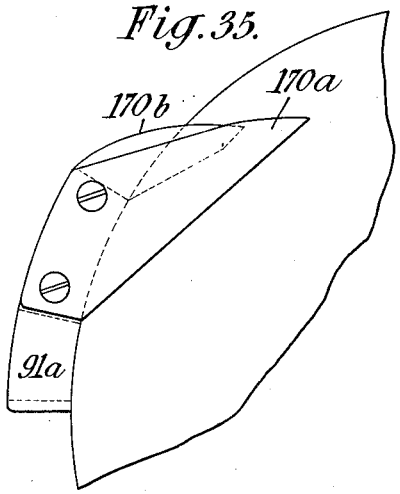
Figure 14:
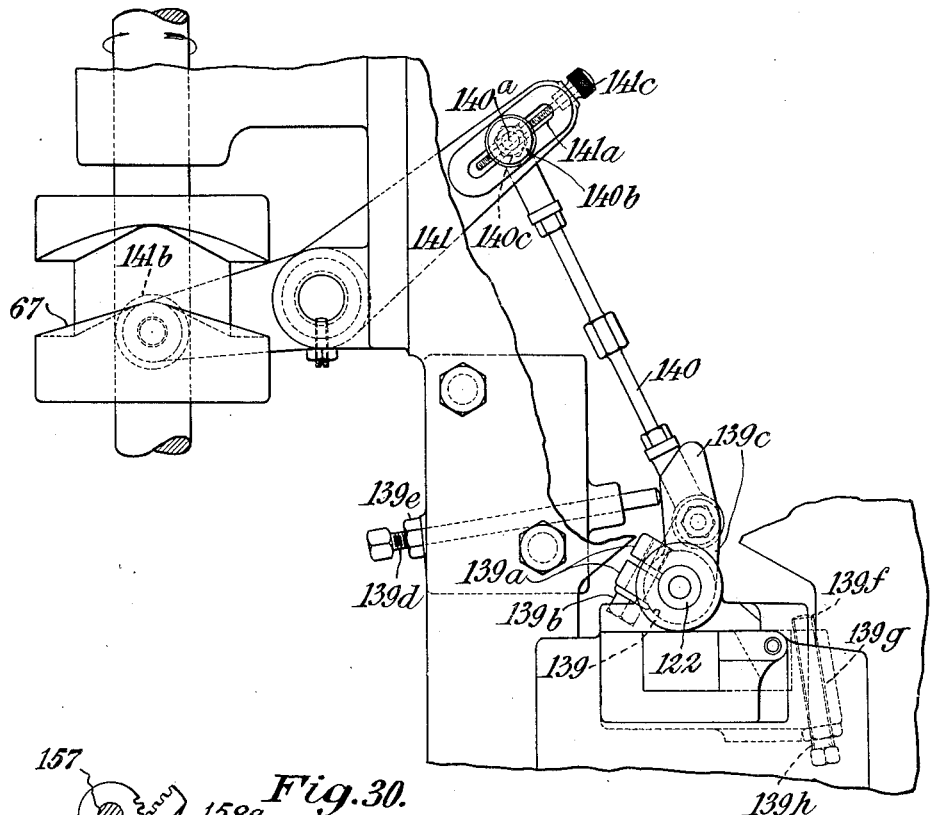
Fig. 14 shows a plan view of the operating mechanism for transferring the rubber washer from its forming station to a pin in the feed dial.

Figs. 34 and 35 are a top plan view and side elevation respectively, of the valve pin kick-out means associated with the dial.

Fig. 36 is a top plan view on an enlarged scale showing the pin-centering means at the washer-applying, the washer-tamping, and the ferrule transfer stations.

Figure 37:
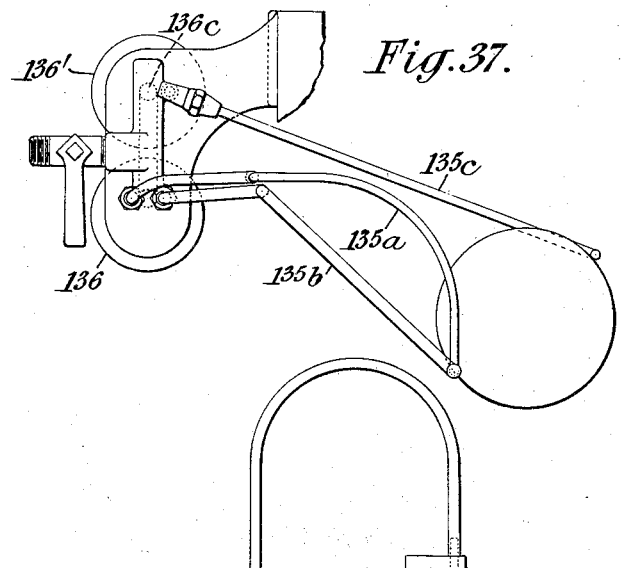
Figure 38:
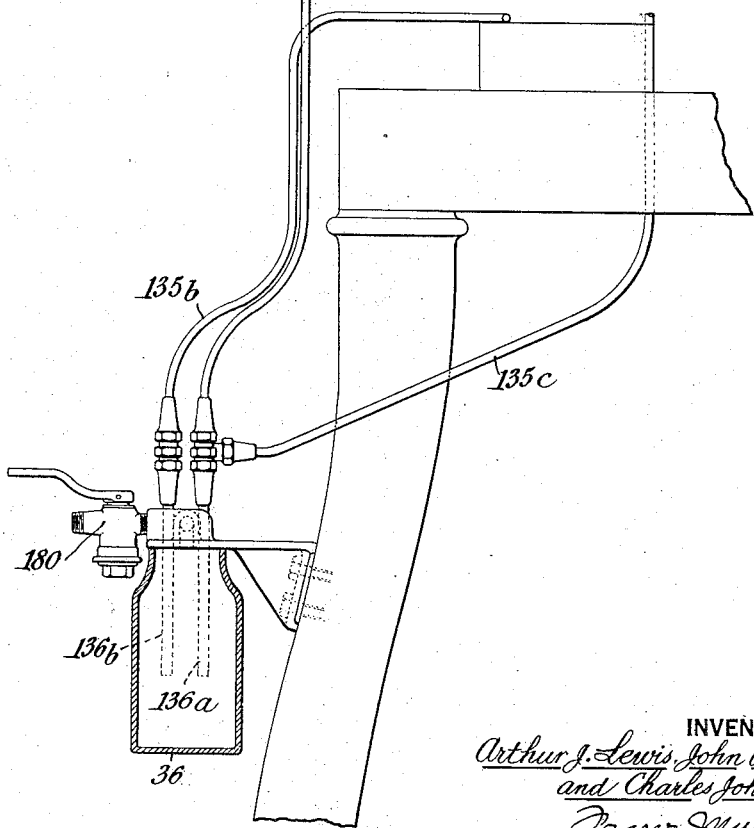

Figs. 37 and 38 are a top plan view and side elevation respectively, of the vacuum controlling means employed in the operation of the machine.

In order that the manner of operating the various parts of the machine which will be hereinafter described in more detail may be clear, the arrangements by which the power is applied to the various mechanisms will be first briefly described.

As shown in the various figures, the parts are either mounted upon or supported by a suitable table 50 carried on a plurality of legs 51. Mounted in suitable bearings supported by the table is a primary driving shaft 52 adapted to be driven by any source of motive power, a secondary shaft 53 adapted to be driven by shaft 52 through the medium of a clutch 54 which is controllable through an operating lever 55 and connecting link 56; a tertiary shaft 57 which is driven from the shaft 53 through the medium of a worm and worm wheel (not shown), and a trip pawl clutch 57' and quarternary shafts 58 and 59 driven respectively from the shaft 57 through the medium of miter gears 57a and 58a and spiral gears 57b and 59b.

Mounted upon the shafts 57, 58 and 59, are numerous cams for controlling the various operating mechanisms. The functions of these various cams will now be briefly described.

Cam 60 controls the oscillatory movement of the dial inverter for the valve pins. Cam 61 operates the dial locking means. Cam 62 controls the dial-indexing or intermittent feed means therefor. Cam 63 controls the movement of the anvil die of the rubber washer-forming means. Cams 64, 65 and 66 control respectively the movements of the outer punch, the inner punch and the knock-out punch of the rubber washer-forming dies. Covered crown cam 67 controls the oscillatory movement of the means for transferring a washer from its forming station to its pin-applying station. Cam 68 controls the washer carrier or transfer means. Cam 69 controls the intermittent feed of the pins from the feed hopper. Cam 70 operates the pin pusher rod. Cam 71 operates the rubber feed of the washer-forming dies. Cam 71' operates the pin-centering means at the washer-applying station. Cam 72 controls the tamping or the tucking of the rubber washer down into the cup on the pin. Cam 73 operates the pin-centering means at the rubber tamping station. Cam 74 operates the pin-centering means at the ferrule-applying station. Cams 75 and 76 control the intermittent feed of the strap metal to the ferrule-forming dies. Cam 77 is an eccentric controlling the operation of the ferrule-forming dies. Cam 78 controls the operation of the ferrule piercing and blanking dies. Cam 79 controls the oscillatory movement of the ferrule transfer means from the forming station to the applying station. Cams 80 and 81 control the movements respectively of the means for positioning the ferrule upon the top of a pin and the means for discharging the ferrule from said first-mentioned means. Cams 82 and 82' respectively operate means for pushing the ferrule down over the pin into contact with the washer and for holding the pin down in its recess, while the first means is retracted. Cams 83 and 83' control the lateral movements of the pin nickers. Cam 84 controls the forward movement of the pin nickers.

A pulley 85 drives a belt which controls mechanism for reciprocating a feed hopper.

The machine of the present invention is designed to make a rubber washer 86, a ferrule 87, and assemble said washer and ferrule upon a valve pin 88 having affixed thereon a valve washer supporting cup 89. The assembled article is shown in Fig. 1 of the drawings.

The various subordinate mechanisms of the machine and their operating means will now be described.

*The dial conveyor and operation thereof.*—In Figs. 4 to 7, and 13, there is shown the dial conveyor and its operating means, which consists of a horizontally-disposed, flat top dial 90 having a downwardly-extending peripheral flange 90a formed with peripheral circumferentially spaced recesses 90b which are fitted with hardened steel blocks 90c formed with peripheral upright recesses 90d which terminate at their top in enlarged recesses 90e. The recesses 90d are designed to accommodate the lower portion of the valve pin 88, while the recesses 90e accommodate the cup 89 on said valve pin. Surrounding the said flange 90a in close proximity thereto is an annular flange 91a carried by a disk 91 mounted below the disk 90. Supported upon the top of flange 91a are a plurality of expander ring sections 91b of angular configuration, which expander ring sections are held against the flange 91a by bowed leaf springs 91c, one end of which is secured to the flange 91a. The inner edges of the expander ring sections lie in close proximity to the outer wall of the flange 90a near the top thereof, and function to hold the valve pins which are seated within the recess 90d in place therein. The dial 90 is mounted upon the top of a vertical shaft 92 by having the hub of the dial 90f seat upon a shoulder 92a of the shaft 92, a nut 92b and washer 92c serving to hold the dial against said shoulder. The annular flange 90a and the blocks 90c therein are formed with an annular groove 90g for a purpose which will hereinafter be made apparent.

At the lower end of the shaft 92 there is loosely mounted a bell-crank lever 93 held in position on said shaft by a nut 92d and washer 92e. Connected to one end 93a of the bell-crank lever 93 is a connecting rod 93b, the opposite end of which is pivotally connected in an elongate recess 94b in a lever 94 which is pivotally mounted intermediate its ends upon a shaft 95 supported in a bearing 95a secured to the table 50 by bolts 95b, and carrying at its other end a roller 94a movable in a cam track 62a formed in the side of cam 62. The other end 93c of the bell-crank lever 93 is formed as a bearing, within which is vertically movable an index pin 96, which carries at its lower end a roller 93a supported on said pin by a pair of nuts 96b and 96c. The upper end of the pin 96 is free to be moved into and out of openings 97a circumferentially disposed in an index dial 97 which is also mounted on the shaft 92 and rotatable therewith. A number of openings in the index dial correspond to the openings in the dial 90, and said index dial governs the intermittent movement of said dial 90, as will be presently explained. The roller 96a is trained over an arcuate track 98 through which extends a vertical rod 98a, which passes through a bearing 99 in a block 100 secured to the machine frame. Fixedly carried by the rod 98a above the bearing block 100 is a cleat 98b, through an arm of which passes a vertically-extending locking pin 98c, the lower portion of which extends through an opening in the bearing block 100, and the lower end of which is adapted to engage in the openings 97a in the index dial and lock the same against movement. Surrounding said pin 98c is a compression spring 98d which bears at one end against a collar 98e fixed to the pin, and at its other end against the under face of the disk 91. The spring, it will be apparent, urges the locking pin downwardly into locking position. For adjusting the angular movement of the bell-crank lever 93, the position of the pivot on connecting rod 93b within slot 94b can be varied by screw 94c.

Vertical movement of the locking pin 98c is controlled through the rod 98a by means of a bell-crank lever 101, the end 101a of which is forked, as shown at 101b, and receives between the arms of said fork the track 98. The inner faces 101c and 101d of said jaws are rounded to permit a slight rocking of the bell-crank lever with respect to said track. The opposite end 101e of the bell-crank lever 100 carries a roller 101f which moves in a cam track 61a formed in the side face of cam 61.

Figure 5:
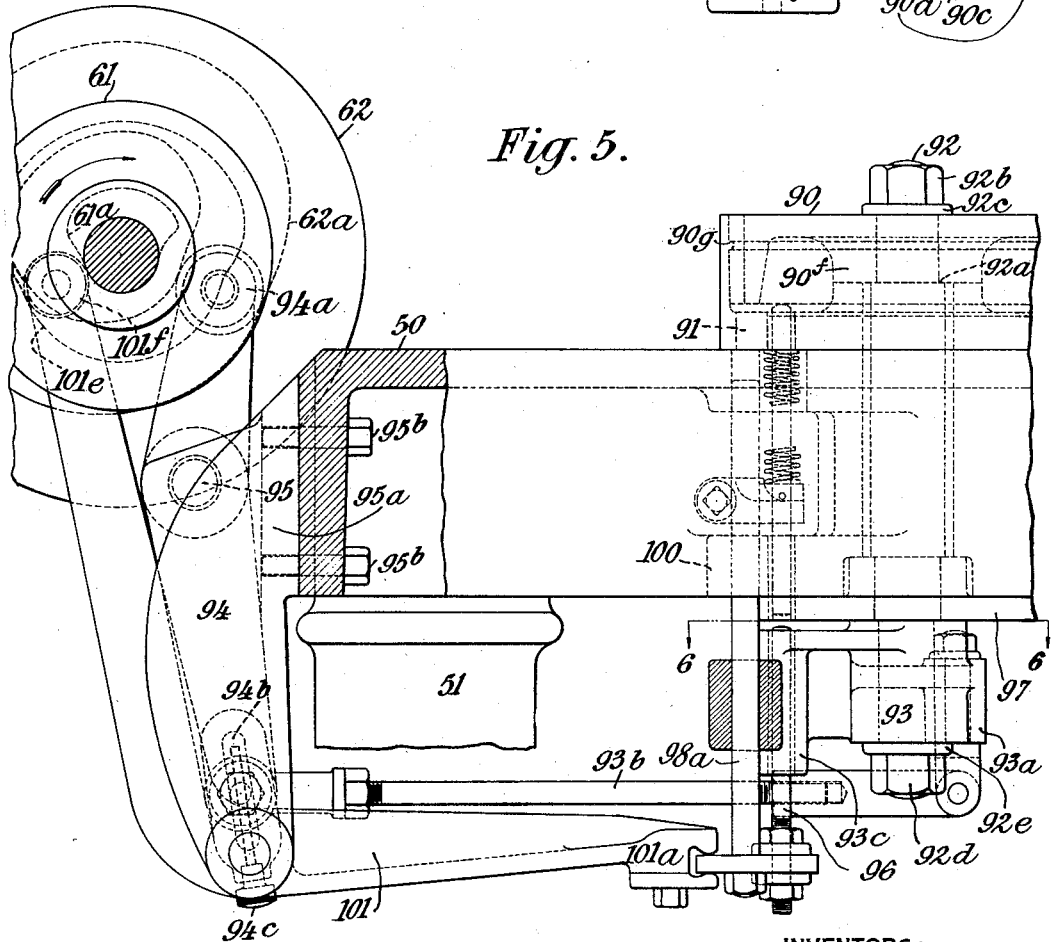
Fig. 5 is a side elevation of the mechanism shown in Fig. 4, parts thereof being shown in section.
Figure 6:
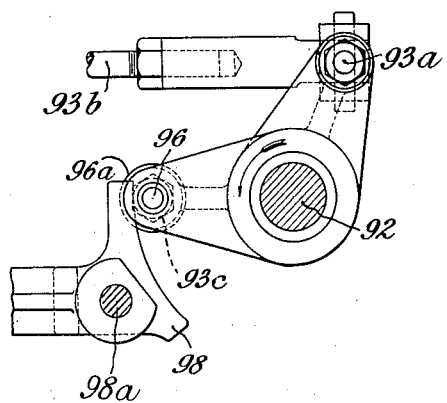
Fig. 6 is a sectional detail of the mechanism shown in Figs. 4 and 5, said section being taken substantially along the plane of the line 6—6 of Fig. 5.
Figure 7:
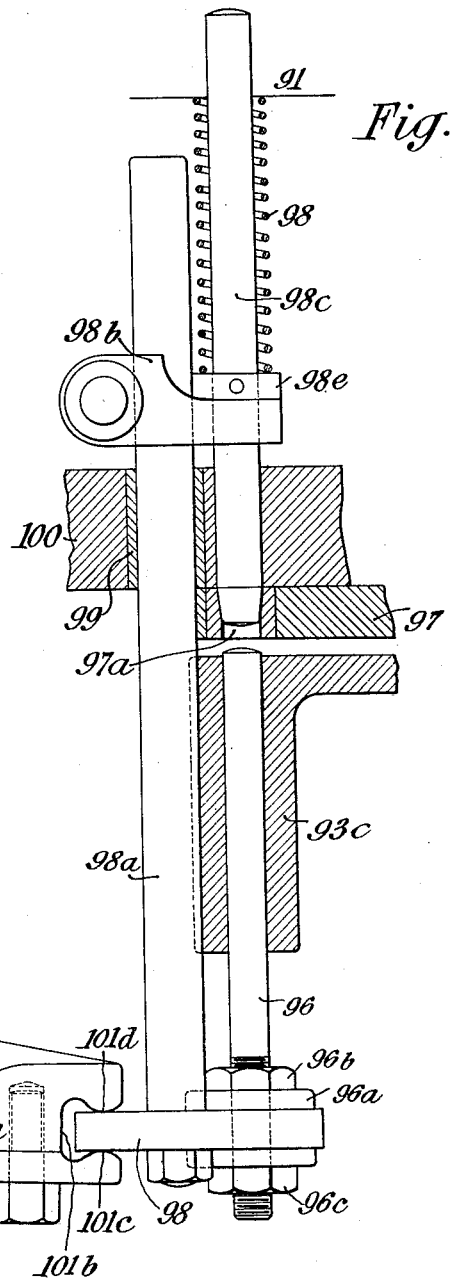
Fig. 7 shows a detail partly in elevation and partly in section of the feed dial indexing and locking mechanism.
Figure 13:
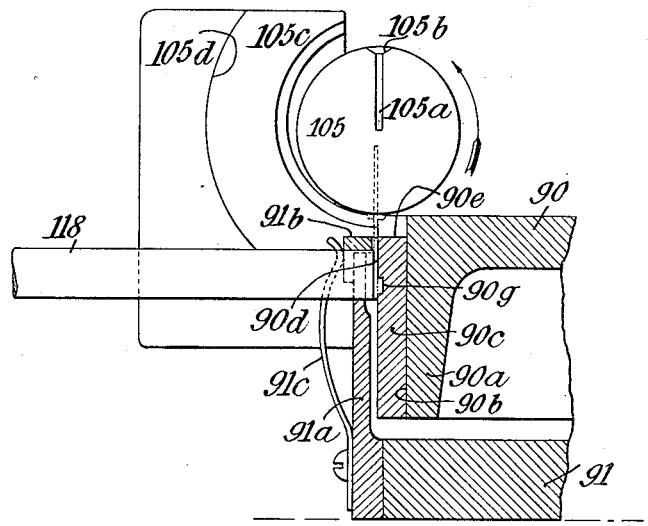
Fig. 13 shows the valve pin inverter in elevation and the feeding dial in radial section.

In Figs. 5 and 7 the index dial is shown in locked position, at which time the roller 101f rides over the low of the cam 61a. In Fig. 6 there is shown the position of the indexing lever when the roller 94a is on the low of the cam 62a preparatory to riding over the high of said cam, upon doing which the index pin 96 is in an opening 97a of indexing dial 97 and moves said index dial through an angular distance corresponding to that between the recesses 90d in the dial 90. It will thus be seen that when the dials 90 and 97 are in locked position the index pin moves to engage the index dial 97 preparatory to giving it its next intermittent movement.

*Valve pin feeding means.*—The valve pins 88 may be fed to the recesses in the dial 90 in any preferred manner. As herein shown, the valve pins are fed from an oscillatory feed hopper 102 down a slideway having an inclined component 103 and a vertical component 104, to a dial inverter 105, from which the pins are delivered to the recesses 90d in the dial 90.

The feed hopper 102 may be of conventional form adapted to feed headed pins to the slideway 130. The hopper is oscillated about a pivot point 102a in the following manner: A belt trained around the pulley 85 drives a pulley 106 affixed to a shaft 106a, upon which shaft is fixed a gear 106b in mesh with a gear 107 mounted on a shaft 107a. Also fixed upon the shaft 107a is a heart wheel 108. In rolling contact with the peripheral surface of the heart wheel 108 is a roller 109 affixed to a crank 110, the lower portion of which is formed with an elongated slot 110a which straddles a guide block 110b, and the upper end of which is pivotally connected at 110c to a lug 102b depending from the underside of the hopper. Within the hopper 102 is a grooved track 102c in which the pins position themselves as the hopper is reciprocated; and when the hopper is in inclined alignment with the slide 103, said positioned pins are fed by gravity down said slide around the angular bend 103a thereof to the vertical component 104.

The valve pins 88 have a lower portion 88a and an upper portion 88b, the latter being shorter than the former, and when said pins are fed from the hopper they do not have these portions all extending in the same direction, as will best be seen from an inspection of Fig. 10. At the lower end of the slide 104 there is provided a cut-off feed 111 for controlling the feeding of the pins 88 singly in timed relation to the dial. The cut-off means 111 may be of any approved construction, and as herein shown, consists of a slide bar 111a provided with projecting lugs 111b fitted with blades 111c, the inner ends of which are chamfered and spaced apart to provide an oblique slot 111d having a width such that as the bar 111a is laterally moved across the track in one direction, it will permit a single pin to enter said slot; and as it is moved in the opposite direction, it will release said pin and permit it to continue down the track. The bar 111a is slidable in a track 111e formed in a supporting frame 112 and is provided near its rear end with a lug or projection 111f. Held in abutting relation against said lug by tension springs 113, 113a is one end 114a of a bell-crank lever 114 which is pivoted at 114b and provided at its other end with a roller 114c which rides over cam 69 on shaft 57.

As a pin is released from the track 104 by the control means 111, it passes down into a flattened, funnel-shaped guide pocket 115, the bottom of which is intermittently closed by the imperforate cylindrical surface of the dial inverter 105 which is positioned directly beneath the outlet of the guide pocket. The dial inverter has formed in one face thereof a radial slot 105a which is countersunk at 105b, which slot is adapted to receive the pin from the guide pocket when positioned thereunder. As all the pins are not positioned in the slide track in the same relation with respect to their long and short portions, the top edges 115a, 115b of the funnel-shaped guide serve as abutments for engaging the end of the long portion 88a of the pins as they pass through the control means to trip the pin, so that the short portion 88b will be lowermost as the pin seats in the guide pocket.

From the dial inverter 105 the pin is delivered to the recess 90d in the dial in reverse position to that in which it is received by the inverter dial, or, in other words, in upright position, in the following manner: The inverter dial 105 is carried on a shaft 116 upon which is also mounted a pinion 116a which is in mesh with a gear sector 117a at the lower end of the upright bar of a T or double-cranked lever 117. One end 117b of the top bar of the T lever 117 carries a roller 117c which is held in engagement with the crown cam 60 through the medium of tension springs 117e and 117f connected respectively to the opposite end 117g of the top bar of the T lever and to the frame of the machine, which frame also carries bearings for the shaft 116 and the pivotal mounting of T lever 117. The rise on the cam 60 is such that it will intermittently oscillate the shaft 116 through an arc of 180°.

When the inverter dial 105 is oscillated through an arc of 180°, the exposed end of the pin 88 is guided in a recess 105c having an arcuate wall 105d until it is almost inverted, whereupon the pusher rod 118 moves laterally toward the dial 90 to engage the pin and move it into the recess 90d. The opposite end of the pusher rod 118 is rigidly connected to an extension piece 118a, which, in turn, is pivotally connected to one end of a lever 119 pivoted at 119a to a bearing supported by the bed of the machine and carrying at its opposite end a roller 119b held in engagement with the peripheral surface of cam 70 by a tension spring 119c. To permit the lateral movement of the pin from the guide 105c into the recess 90d, the upright flange 91a and the expander ring 91b are cut away or severed at said point. After the lower portion of the pin is seated in the recess 90d and just prior to the inverter dial being oscillated to receive another pin, the conveyer dial 90 is moved to present the pin to its next station, and in so doing withdraws the upper portion of the pin from the inverter dial. Simultaneously with said movement the pusher rod 118 is withdrawn for engaging the next pin received by the inverter dial.

*Rubber washer forming mechanism (Figs. 14 to 24).*—In forming the rubber washers, a long strip or ribbon of rubber is clamped between a pair of jaws 120a, 120b of a carrier 120 with the edge portion of the ribbon projecting laterally therefrom, said carrier being adapted to be intermittently moved to feed the rubber ribbon to a rubber cutting die unit 121, which, in cooperation with an anvil 122, are adapted to cut out the rubber washers 86 from the projecting edge of the ribbon. The carrier 120 consists of elongate top and bottom elements 120', 120², the bottom element 120² having an undercut longitudinal groove 120c and a rib 120d adapted to engage upon and be longitudinally moved over a rail 123c and the base respectively on the top of a supporting bracket 123 affixed to the bed of the machine. The top element 120' consists of a plurality of abutting plates 120g which are pivotally mounted upon a longitudinally-extending pivot rod 120f. Between each pair of plates, complemental portions are cut away, and in said cut away portions are mounted bearing plates 120g'. Seated within a groove in element 120² is a longitudinally-extending, normally round rod 120h, formed where it underlies the plates 120g with squared portions 120h', and where it underlies the bearing plates 120g' it is left round. At each end said rod 120h is provided with a lever 120h² whereby the rod may be turned on its axis. When so turned by raising the levers 120h² it lifts the plates 120g to open the jaws 120a, 120b, to permit the insertion of a rubber strip therebetween. The jaws 120a and 120b are held in rubber clamping position by a plurality of compression springs 120i, one end of which bear against the upper surface of the plates 120g, and the other end of which engages against the underside of the head on screw bolts 120j which are threaded into openings in the element 120².

The lateral edge of the element 120² opposite to that having the jaw 120b is formed throughout its length with ratchet teeth 120k in which engages one end of a pawl 120l, the opposite end of said pawl being pivoted at 120m to one end of a bell-crank lever 123' which is pivoted to the machine frame at 123a. The opposite end of the bell-crank lever is provided with a roller 123b which is held in engagement with the surface of cam 71 by a tension spring 123e. The pawl 120l is held in contact with the ratchet teeth through the medium of a spring 120n. It will thus be seen that as the roller 123b rides over the surface of cam 71, the pawl 120l will function to intermittently move the carrier 120 along the top of the bracket 123 to intermittently present successive portions of the rubber strip to the cutting dies.

The carrier 120 is removable from the bracket 123 and is manually replaceable by a second carrier when the rubber strip is completely punched; or said second carrier may be placed upon the bracket in abutting relation to the first carrier before the rubber therein completely passes the washer punching station. To avoid operation of the rubber-cutting dies when no rubber is being fed thereto, there is provided an automatic stopping mechanism for the machine. This stopping mechanism, as herein shown, comprises a pivoted lever 57b, one end 57c of which is held in sliding contact with the top element 120' of the carrier by a spring (not shown), and the other end 57d of which is positioned beneath the end 57e of a pivoted bell-crank lever, the opposite end 57f of which is adapted to operate the trip pawl clutch 57'. When the carrier 120 passes from under the end 57c of the lever 57b, said end will be moved downwardly by the spring into contact with the top face of bracket 123, and the opposite end 57d of said lever will be raised, and in its upward movement will trip the arm 57e of the bell-crank lever to operate the trip pawl which will throw out the clutch 57'. The clutch 57' may also be operated by the lever 55, as previously explained, or by a foot pedal (not shown).

The cutting die unit 121 consists of an outer die or punch 124 carried by a supporting element 124a, an inner punch 125 supported by a tubular element 125a, and a knockout punch 126 supported by a tubular element 126a. The elements of the cutting die unit are all mounted in a suitable framework 121a which is removably anchored in operative position to the bed of the machine by having the end 127a of a spring-pressed plunger 127 engage in a suitable notch 121b in the frame 121a. The opposite end of the plunger 127 extends through an opening in a lug 127c depending from the front of the machine, and is fitted with a knob 127b, the spring 127d having one end pressing against the lug 127c, and its other end against a shoulder 127e on the plunger, as best shown in Figs. 19, 20 and 22.

Adjustably carried by the outer punch 124, the inner punch 125 and the knock-out punch 126, are slide-blocks 124b, 125b and 126b, respectively each provided with a bifurcated jaw 124c, 125c and 126c, respectively, said slide-blocks being guided by and having limited movement within the frame 121a. Engaging in said jaws and adapted for rocking movement therein are the levers 128, 129 and 130, respectively, which are pivoted intermediate their ends 128a, 129a and 130a, respectively, to a lug 131 depending from the machine frame. The opposite ends of said levers are each provided with a roller 128b, 129b and 130b, respectively, adapted to ride over the surface of cams 64, 65 and 66, respectively. The rollers 129b and 130b are held in contact with their respective cam surfaces through the medium of tension springs 129c and 130c, respectively. The ends of the levers 128, 129 and 130 which engage in the bifurcations in slide-blocks 124b, 125b and 126b, respectively, it will be appreciated, are subject to considerable wear; hence, in order to take care of such wear, the ends of said levers are formed with separable wear-resisting elements or cleats 128d, 129d and 130d, respectively, and are secured to said levers by screws and other appropriate means.

The throw or stroke of the various die elements of the cutting unit are, of course, controlled by their respective cams. However, to compensate for wear on the cams and for otherwise carefully adjusting said stroke, additional adjusting means are necessary. For taking care of this adjustment with respect to the outer die 124, the slide-block 124b is screw-threadedly adjustable on the lower end of the supporting element 124a and is held in such adjustment by the clamping screw 124d. For taking care of said adjustment with respect to the inner die 125, adjusting nut 125d and lock nut 125e are employed. Adjustment of the knock-out 126 is controlled by an L-shaped element 126f which is longitudinally adjustable in a supplemental slide-block 126d by a bolt 126e, the inner end of the foot of the L-shaped member 126f engaging in a longitudinal slot in tubular member 126a which supports the knock-out punch. The cutting dies in conventional manner cooperate with a die block or bolster 121c.

The anvil 122 cooperates with both the outer punch 124 and the inner punch 125 of the cutting die unit to blank out the rubber washers from the rubber ribbon which is fed to the dies by the rubber feed mechanism, but a washer, upon being blanked out, is not removed from the rubber strip simultaneously with said blanking out operation, but on the contrary is left there for an interval after the cutting dies have receded from the anvil. The anvil is also movable vertically away from and toward the bolster 121c, said movement being controlled by a cam-operable lever 132 which is pivoted at 132a to the opposite side of the depending lug 131 to which the levers 128, 129 and 130 are pivoted. One end of said lever 132 carries a roller 132b which is movable in a track on cam 63; and the other end of said lever is pivotally connected to a ring 122a supported in a collar 122b adjustably mounted at the lower end of a tubular element 122c which passes through an opening 123d in the bed of the machine, the upper end of said tubular element 122c being mounted in a carrier 133 in which the anvil is vertically movable.

*Washer transfer mechanism.*—As roller 132b rides over the low spot in the cam track 63 the opposite end of the lever 132 moves the element 122c and the carrier 133 upwardly, and when it rides over the high spot, it moves said carrier downwardly. The anvil head is carried by the carrier 133 and accordingly partakes of the latter's movements. After the anvil head has been raised, the carrier 133 is rocked about the tubular element 122c as a pivot, as will be presently explained, through an angle such as will displace the anvil and bring the washer transfer tube 134, which is also supported by the carrier 133, into axial alignment with the washer forming station. The transfer tube 134 is then lowered in a manner hereinafter explained, into contact with the blanked out washer in the rubber strip, whereupon the knockout means 126 is moved upwardly by its operating lever 130 to push the blanked out washer up into the transfer tube, within which there is an abutment 134a having a central opening 134b and peripheral flutes or passages 134c. In spring-pressed engagement with the top of the transfer tube 134 is a tube 135a (Figs. 37 and 38) which is connected with a source of fluid suction, which, acting upon the pushed up washer, sucks up the pierced center of the washer and delivers it to a receptacle 136 (Fig. 37), and also functions to hold the blanked out washer against the abutment within the tube until released therefrom in a manner as will be presently explained. The tube 134, after receiving the washer, is raised, whereupon the carrier 133 is again moved through an arc in the opposite direction to that last described, after which the transfer tube 134 is again moved downwardly into position for applying the suction held washer upon a pin carried in the dial 90.

Application of the washer down over the pin is accomplished through the vertical movement of a control rod 134d in the following manner: On the lower end of the rod there is adjustably mounted a collar 134e which carries a ring on which is rockably mounted one end of a lever 137, which is pivoted at 137a to the depending lug 131, the opposite end of said lever carrying a roller 137b which is held in rolling contact with the surface of cam 68 by a tension spring 137c. The rod 134d passes freely through the tubular element 132c and is formed near its top with an abutment 134e, and at its top with a second abutment in the nature of a screw head 134f. Below the abutment 134e the rod 134d loosely carries a cross piece 134g provided with a depending pin 134h, a guide opening 134i and an upwardly-directed tubular nipple 134j to which the tube 135 is attached. Below the cross piece 134g, the rod 134d carries a clamp 134k having an opening through which pin 134h passes, a second opening through which extends an upwardly-directed guide pin 133a on the carrier 133, and the opposite end of said clamp being fast on transfer rod 134. Normally the cross piece 134g is held in contact with the clamp by a spring 134m, thereby establishing a fluid-tight connection at 134n between the abutting ends of the tube 134 and the bottom of the nipple 134j, and the lower end of pin 134h is in spaced relation to the top 133b of carrier 133. It will thus be seen that as the roller 137b rides over the dwell 68a of cam 68, the transfer rod will be moved down over a pin, thus positioning the washer held within the transfer rod onto the pin. As this downward movement continues, the depending pin 134h strikes against the surface 133b, whereupon the leak-tight seal at the point 134n is broken, thus removing the suction action from the washer, which thereupon will be frictionally held upon the pin as the tube 134 is withdrawn therefrom. When the roller 137b passes over the dwell 68b on cam 68, the transfer tube is in position to receive a washer at the washer forming station.

Below the bed of the machine the tubular elements 122c is provided with a split collar 139 having lugs 139a thereon, through which passes a bolt 139b which serves to clamp the collar upon the element 122c, said tubular element or bushing having a projecting lug 139c through which is pivotally connected one end of an adjustable connecting rod 140; the other end of which carries a pin 140a which passes through an elongated slot 141a provided in one end of a bell-crank lever 141, said pin 140a being held within said slot by suitable means, such as a washer 140b and a nut 140c. Angular movement is imparted to the collar 139, and hence to the tubular element 122c, by the covered cam 67, over which rides a roller 141b mounted at the opposite end of the lever 141. For compensating for wear on the cam and the roller, and for otherwise accurately controlling the stroke of the collar 139, an adjusting screw 141c is fitted into the end of the lever 141 and projects into the slot 141a, adjustment of said screw determining the position for the end of lever 140. For adjusting the limiting angular movement of the collar to the left in Fig. 14, there is provided a bolt 139d which passes through the bed of the machine and is adapted to be held in adjusted position by a lock nut 139e. For adjusting the limiting angular movement of the collar in the opposite direction, a second stop in the form of an adjustable bolt 139f extending through a lug 139g depending from the bed of the machine is provided, a lock nut 139h being adapted to hold the bolt in adjusted position.

It will be apparent that the cams are all so designed as to operate their respective levers and mechanisms in properly timed relation, so that as a rubber washer is being blanked out, a second washer, held by suction in the transfer tube 134, is being applied to a pin, and as both the anvil 122 and the transfer tube 134 are raised out of operative position, the carrier 133 is oscillated through its connection with tubular element 122c to present the tube 134 to receive the last blanked out washer and to then again return said tube to washer-applying position, which sequence of operations are periodically repeated.

*Washer tamping or tucking action (Figs. 25 and 26).*—After a washer has been postioned upon a pin at the washer-applying station, the dial 90 is moved to present said pin and washer to the next operating station, whereat means are provided for moving the washer down into the cup 89 on the pin. Because of the resiliency of the washer it has been found that pushing on of the washer can not be accomplished by a steady or continuous downward movement. Accordingly, we provide a mechanism whereby the washer is subjected to a plurality of tamping or tucking movements to efficiently seat it within the cup. In the construction disclosed, this mechanism comprises a tubular element 142 which is supported by a cross-piece 142a mounted near the top of a vertically movable rod 142b which passes through a bearing in a bracket member 143 mounted on the bed of the machine. The rod 142b extends below the bed of the machine and is there provided with a tension spring 142c which normally urges the rod downwardly, said spring bearing at one end against a plunger nut 142d at the lower end of the rod and at its other end against an abutment 143a on the under side of the bracket 143. The bracket has an offset portion which is cut away as shown at 143c, through which cut away portion the rod 142b passes and is there provided with a clamping collar 142e having a projecting lug 142f, which, under the action of spring 142c, bears upon the end of a lever 144 which is pivoted at 144a to a stub shaft 143d carried by the bracket 143. The other end of the lever 144 carries a roller 144b which is held in rolling contact with the surface of cam 72 by the downward action of the lug 142f on the opposite end of the lever. The surface of the cam 72 is formed with a plurality of dwells 72a whereby, as the roller 144b rides thereover, the rod 142b, and hence the tube 142, are progressively moved downwardly in a jerky manner by the tension of spring 142c to tamp or tuck a washer down into the washer cup on a pin. The bracket 143 is also provided with an offset angular portion 143e which extends over the crosspiece 142a and rigidly carries a pin 143f which extends down through the tube 142. The pin 143f serves to guide the tube 142 in its vertical movements, and the lower end thereof acts as a stop to prevent the upward movement of the valve pin during the tucking operation. Said portion of the bracket also carries a depending pin 143g, which passes through an opening in the cross-piece 142a and serves to guide said member in its upward and downward movements.

*Ferrule-forming and transfer mechanisms (Figs. 1 and 27–32).*—The pin with the rubber washer fitted within the cup is now ready to receive a ferrule 87. This ferrule may be formed on a separate machine and fed by suitable means to the pin, or as shown herein, it may be formed on the same machine and transferred from its forming station to the pin by the mechanism disclosed.

The ferrule, which is a tubular element, is preferably made from strap metal 145 by a plurality of cup-forming or stamping operations by a gang of dies, herein indicated generally by the reference character 148. The strap metal 145 may be fed from a reel suitably mounted on a stand 146, supported by a bracket 146a, secured to the bed of the machine. The strap metal is intermittently fed to the forming dies by feeding means 147, the movements of which are controlled by a double-pivoted lever 147a, the opposite end of which is held in rolling contact with cams 75 and 76 on shaft 58. The stamping operation of the gang of dies is also controlled from shaft 58 by a cam eccentric 77.

The piercing operation of the stamped cup is performed by a piercing punch 149, which is operable from a separate cam eccentric 78, said piercing punch being operable through the holding punches 148a, 148b, of the gang of dies. Also carried by the same die block as the piercing punch 149, is a combined blanking punch and transfer rod 150 which is operable to blank out the pierced ferrule and transfer it, after being blanked out, by a further movement of the punch from the blanking die to a ferrule-transfer means, indicated generally by reference character 151.

As herein shown, the ferrule-transfer means comprises a tubular element 151a having a reduced end 151b within which there is provided an angular bent spring 151c, the lower end of which extends radially inwardly into the open end of the tube 151b, and functions to resiliently hold a ferrule therein after such ferrule has been pushed thereinto by the transfer rod 150, said tubular element being oscillatable about an axis at right angles to the axis of the tube, as will be presently described.

Extending through the tube 151a is a second tubular member 151d, the upper end of which is fitted with a collar 151e having a lateral lug or projection 151f which seats in a recess in the lower end of a vertically movable control member 152, the movement of which is governed by a bell-crank lever 153, which is pivoted at 153a to a stub shaft 154, carried by a bracket 154a mounted on the bed of the machine. One end 153b of the lever is rounded and rockably engages in a bifurcated lug 152a carried by the member 152 near its top, while the other end of said lever carries a roller 153c, which rides in a cam track in cam 81 mounted on shaft 57 and is held in said cam track through the medium of tension spring 153d.

Inwardly of the tubular member 151d is a movable pin 151g, formed at its top with an enlargement 151h adapted to be held in spaced relation to the top of collar 151e through the medium of a coil spring 151i. Downward movement of the pin 151g through the tubular element 151d is accomplished through the movement of a vertically movable rod 155, the upper end of which carries a bifurcated lug 155a, between the arms of which is rockably mounted the end 156a of a bell-crank lever 156, which is also pivoted about stub shaft 154, and carries at its other end a roller 156b which rides over the surface of cam 80. The roller 156b is normally held in contact with the surface of cam 80 by a tension spring 156c. For guiding the movements of members 152 and 155, they are mounted within a slideway formed in the bracket 154, the front of said slideway being covered by a plate 154b.

The ferrule-transfer means 151 is oscillatable about the axis of a shaft 157 so as to alternately present the receiving end of the tube 151b in horizontally inclined position to receive the ferrule from the ferrule blanking-out station, and after having received said ferrule, for moving said tube into vertical position for transferring the ferrule to a pin. For oscillating the ferrule-transfer means, the outer tube 151a is mounted upon one end of shaft 157, the opposite end of which carries a mutilated gear 157a, the teeth of which are in mesh with a gear sector 158a carried at one end of a lever 158 which is pivoted at 158b to a pivot pin 159a mounted in a supporting block 159, the opposite end of the lever 158 being provided with a lug 158f through the end of which is threaded a set screw 158g provided with a lock nut 158h. Also pivoted on pin 159a is one end of a lever 158A, the opposite end of which carries a roller 158c, held in rolling contact with the surface of cam 79 by the tension springs 158d and 158e. For adjusting the limiting positions of the angular movement in one direction of the transfer means 151, the set screw 158g on the end of lever 158 is held in engagement with a projection 159b on the lever 158A. For adjusting the limiting position of the angular movement of the transfer means in the opposite direction, there is provided an adjustable set screw and lock nut 160a which passes through an upstanding lug 160 mounted on the bed of the machine, the end of set screw 160a being adapted to engage the tubular element 151a. For accommodating the transfer tube in ferrule-receiving position, the anvil block of the ferrule-forming dies is appropriately recessed, as shown at 148c. For maintaining the tube 151d in proper position with respect to tube 151d while the latter is being oscillated, there is provided an arcuate track 161a in a member 161 for guiding the lug 151f.

The ferrule transfer means 151 after receiving a ferrule, is oscillated about its axis and brought to the position shown in Fig. 27, whereupon the tube 151b is moved downwardly as the roller 153c moves over the rise 80a of cam 80, to position the ferrule upon the top of the pin. Thereafter the roller 156b rides over the rise 81a of cam 81 to move the rod 151g downwardly into contact with the end of the ferrule within the tube 151b. The tube is then retracted while the ferrule is being held on the pin by rod 151g, after which the rod is retracted, leaving the ferrule positioned on the end of the valve pin. The valve pin and ferrule is then carried by the dial 90 to its next station.

*Ferrule seating and swaging mechanism (Figs. 31, 31a, 33 and 33a).*—The pin carrying a ferrule at its top, upon reaching this station is acted upon by means which pushes the ferrule down into seating engagement with the rubber washer and by other means which operates upon the assembled unit to hold the ferrule against movement on the pin in the opposite direction.

The ferrule pushing or seating means comprises a tubular element 161 having a reduced lower end 161a adapted to engage a shoulder 87a on the ferrule, said tube 161 being vertically movable in a support 162 carried by the bracket 154a. Near the top of the tubular element 161 it is fitted with an adjustable collar 161b having spaced flanges between which it rockably receives the arms of the bifurcated end 163a of an extension element mounted at one end of a bell-crank lever 163 which is pivoted at 163b to a stud carried in a bearing 154b on the bracket 154a. The other end of the bell-crank lever 163 carries a roller 163c mounted within a cam track 82a in cam 80. Extending through the tubular element 161 is a rod 164, the upper end of which is adjustably clamped within a split collar 165a carried at the end of a bell-crank lever 165 which is pivoted at 165b on the stud shaft 154. The other end of lever 165 carries a roller 165c which is held in engagement with the surface on cam 82' by a tension spring 166. As the roller 163c rides over the rise in cam track 82a, the tubular element 161 is moved downwardly, and in so moving engages the ferrule on a pin and pushes the same down into contact with the surface of the rubber washer. Before said tube 161 is retracted, the rod 164 is moved down into contact with the top of the valve pin as the roller 165c rides over the rise in cam 82', and serves to hold said valve pin against upward movement as the tubular element 161 is retracted; and also during the interval that the swaging elements (which will be presently described) are operated to swage the valve pin above the applied ferrule.

For holding the ferrule and washer in assembled relation on the pin, the pin is swaged above the top of the ferrule, as shown at 88c in Fig. 1. This swaging operation is carried out by a pair of swaging dies 167, 168, fixed to the ends of a pair of levers 167a, 168a which are pivoted at 167b and 168b respectively, to a supporting element 169; the opposite ends of said levers carrying rollers 167c and 168c respectively, which are held against the surfaces of cams 83 and 83' respectively, by a tension spring 170. As the rollers ride over the rise on the respective cams, the swaging dies at the opposite ends of the levers are moved toward each other to swage a valve pin. The levers 167a and 168a which carry the swaging dies are mounted on the carrier block 169 which is adapted to be projected toward and away from the dial 90 through the medium of a control rod 169a, at the inner end of which is mounted a roller 169b positioned within a cam track 84a on cam 84. The carrier member is movable in a suitable guide or track, which is not shown. The cooperative relationship of the cams, 83, 83' and 84 is such that as the roller 169b moves over the rise in the cam track 84a, the swaging dies are moved forward, and when at the limit of their forward movement, the rollers 83 and 83' ride over the rise in their respective cams to move the swaging dies toward each other to swage the pin. This being accomplished, the swaging dies are again moved apart, and the carrier element is then retracted.

Figure 4:
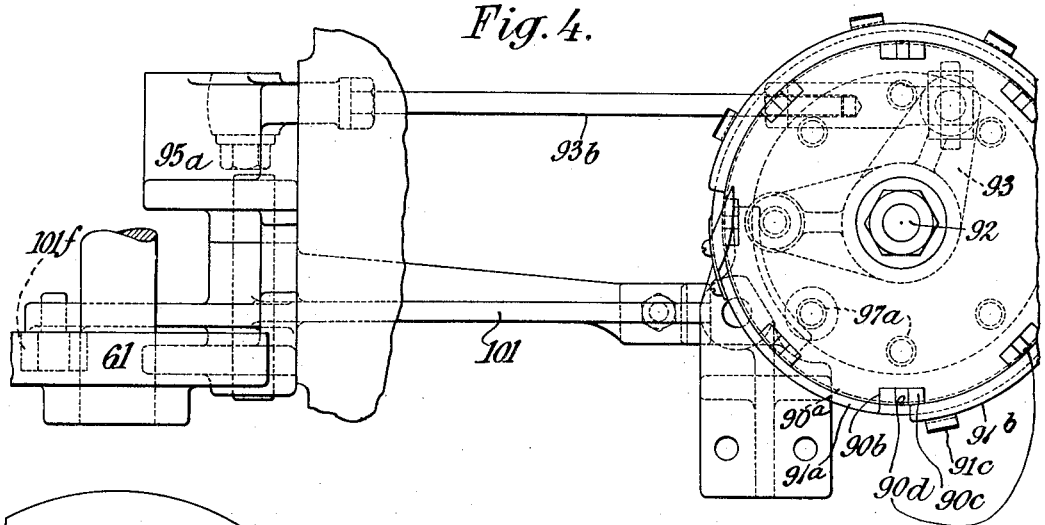
Fig. 4 is a fractional top plan view on an enlarged scale of the mechanism for controlling the intermittent feed of the dial or conveyor.

The assembled valve pin, upon being advanced from the last station, approaches the discharge or kick-out of the dial, which functions to discharge the assembled units from the dial. This kick-out element is mounted on the flange 91a, as best shown in Figs. 4 and 35, and comprises a casting or machined element 170 having projecting lips 170a and 170b adapted to engage respectively over the top face of the dial and in the groove 90g in the depending flange of the dial. The outer edges of the lips 170a and 170b extend obliquely to the circumferential wall of the dial and are adapted to engage a pin seated within the recess 90d, both above and below the washer cup thereon, to move the pin radially outwardly as the dial is rotated toward said lips.

*Pin centering means.*—For accurately positioning the pins fed by the dial at the various operating stations so that the operating mechanisms will properly engage thereover, pin centering means are provided at the washer-applying station, at the washer-tucking or tamping station, and at the ferrule transfer station. These centering means may be of any preferred construction and may be operable either from a central operating point or from separately controlled points. As herein shown, the centering means are operated from separately controlled points. The centering means at the washer-applying station is controlled from the cam 71' mounted on shaft 57 through the medium of a roller 171a carried by one end of a link 171; the other end of which is rigidly secured to one end of a lever 172 which rigidly carries a projecting arm 172a intermediate its ends; and at its opposite end is pivotally connected, as shown at 172b, to one end of the bell crank lever 173. The lever 173 is pivotally mounted at 173a and is formed at its opposite end with a V-shaped slot 173b within which a pin may seat. The end of the arm 172a, which is complemental to the end of the lever provided with the V-shaped slot 173b, is formed with a flat surface 172c against which a pin can roll. A tension spring 174 connects the levers 172 and 173 in such manner as to draw their complemental ends toward each other in pin-centering position. The pin-centering ends of the levers 172 and 173 are moved apart to release a pin as the link 171 rides over the dwell in the cam track 71'. The end of the lever 172 adjacent the pivot 172b is arched, as shown by the shaded lines in Fig. 36, to permit free passage thereunder of the upper ends of the pins seated within the dial, as the latter is rotated.

The pin-centering means at the washer-tamping station is quite similar in construction and operation to that at the washer-applying station just described and is operable by a lever 175 and cooperating lever 176 provided at one end with a pin 176a which is guided in a slot 172d in the lever 172, the lever 175 being controlled by cam 73 on shaft 58.

The pin-centering means at the ferrule transfer station comprises a link 177 which carries at one end a roller 177a held in contact with the surface of cam 174 by a tension spring 177b and at its opposite end is formed with an offset angular element provided with a lateral arm or jaw 177c provided with a V-shaped recess 177d. For cooperative engagement with said last-named recess, a second arm or jaw 178a carried by a member 178 is provided with a complemental straight edge 178b. The arms or jaws 177c and 178a are movable in opposite directions through the medium of a pinion 179 mounted for cooperative engagement with racks 177e and 178b on the members 177 and 178 respectively. It will thus be seen that as the roller 177a rides over the rise on cam 74, the jaws 177c and 178a will be separated, and as it rides over the low of said cam, said jaws will be brought together with their V-shaped slots in pin-clamping and centering position.

*Suction means.*—For collecting and separating of stampings from the rubber in the formation of the rubber washers, and of the metal in the formation of the ferrules, and for preventing said stampings from interfering with the operation of the machine, we provide suction means at said forming stations for carrying away said stampings. In Figs. 37 and 38 there is diagrammatically shown the vacuum or suction line connections of the machine. These comprise a source of fluid suction controlled by a valve 180 connecting with the interior of jars 136 and 136', which are tightly sealed and have extending through their tops tubes 136a, 136b and 136c, which do not reach to the bottom of said jars, for a reason which will be presently made apparent. The tubes 136a, 136b and 136c connect outside of said jars with tubes 135a, 135b and 135c respectively. The tube 135a is connected to the end of nipple 134j for carrying away the rubber washer piercings at the washer-forming station and for holding the washer within the transfer tube 134, as hereinbefore explained. The free end of the tube 135b overlies the surface of the dial 90 at the base of the washer-applying station and functions to carry away a washer when discharged from the transfer tube 134 in the event that no pin is in the dial at said station to receive said washer. The tube 135c receives the metal piercings at the ferrule-forming station; as well as the scrap of the strap metal which is left after the ferrules are formed therefrom. It will be noted that the tubes 135a and 135b lead to jar 136, and that tube 135c leads to jar 136', so that the rubber and metal scrap may be separately reclaimed.

From the detailed descriptions of the various subordinate mechanisms and their manners of operation, as well as their correlation with the intermittent dial feed of the valve pins to said various operating stations, it will be apparent that we have provided a machine which, in a wholly automatic manner, makes a rubber washer, makes a metal ferrule, feeds valve pins, and assembles said washers and ferrules on said valve pins.

The specific instrumentalities disclosed herein, it is to be understood, are only shown by way of example and are not to be construed as limitations upon the invention. Hence, other instrumentalities in the same or modified combinations may be substituted for those herein disclosed without departing from the spirit of the invention.

What we claim is:

1. A machine of the class described, comprising pin feeding means, a rotatable dial having peripheral recesses for receiving the pins, means disposed intermediate the pin feeding means and the dial for receiving a fed pin in one position and delivering it to a recess in the dial in reverse position, and means for pushing the pin radially inwardly into the dial recess, the movements of the various means being intermittent and operatively timed.

2. In a machine of the class described, an intermittently rotatable dial and means for imparting intermittent movement to said dial and for locking said dial after each movement, said means comprising an index member mounted on the dial shaft, said index member having recesses, an index pin and a locking pin engageable in said recesses, means for moving the index pin through an arc while in engagement in a recess in the index member to rotate said member, and means for approximately simultaneously moving the index pin into a recess and moving the locking pin out of a recess, respectively.

3. In a machine of the class described, an intermittently rotatable dial and means for imparting intermittent movement to said dial and for locking said dial after each movement, said means comprising an index dismounted on the dial shaft, said index disk having recesses on its opposite faces, an index pin and a locking pin engageable in said recesses, means for moving the index pin through an arc while in engagement in a recess in the index disk to rotate said disk, and means for approximately simultaneously moving the index pin and the locking pin in the same direction, whereby the index pin and the locking pin will be moved into and out of recesses on the opposite sides of the disk, respectively.

4. In a machine of the class described, an intermittently rotatable dial and means for imparting intermittent movement to said dial and for locking said dial after each movement, said means comprising an index disk mounted on the dial shaft, said index disk having recesses, an index pin and a locking pin engageable in said recesses, a bell-crank lever pivotally mounted about the dial shaft, one end of said lever carrying the index pin and the other end being connected to a connecting rod, a cam-operable lever connected to said connecting rod for moving the bell-crank lever through an arc while the index pin is in engagement in a recess in the index disk to rotate said disk, and a second cam-controlled lever for approximately simultaneously moving the index pin into a recess and moving the locking pin out of a recess, respectively.

5. A machine of the class described, comprising washer blanking, piercing and knock-out dies, a transfer tube for receiving the blanked out washer as it is knocked out, and suction means operating through said tube for carrying away the part punched out of the washers by the piercing die when the blanked out washed is received by the transfer tube.

6. A machine of the class described, comprising washer blanking, piercing and knock-out dies, transfer means for receiving a washer as it is knocked out and means for moving said transfer means from its washer-receiving station to a distant station.

7. A machine of the class described, comprising washer forming means, and means for transferring a blanked washer from its forming station to a distant station, said washer-transferring means being mounted upon an oscillatable carrier, which is also provided with the anvil for the washer forming means.

8. A machine of the class described, comprising washer forming means including a knock-out punch, a tube for transferring the blanked out washer upon being discharged from the forming means by the knock-out punch, suction means for holding said washer within said tube, and a carrier for moving the tube from the washer forming station to a distant station.

9. A machine of the class described, comprising means for forming elastic washers, a tube for receiving a blanked out washer, suction means for holding said washer within said tube, a carrier movable about an axis for moving the tube from the washer forming station to a distant station, means for applying the washer upon a member at said distant station, and means for breaking the suction action upon the washer in the tube.

10. A machine of the class described, comprising washer forming means, a tube for receiving the blanked out washer, suction means for holding said washer within said tube, a carrier movable about an axis for moving the tube from the washer forming station to a distant station, means for applying the washer upon a pin at said distant station and for breaking the suction action upon the washer in the tube, and supplemental suction means at said distant station for carrying away the washer in the absence of a pin over which the washer is to be applied.

11. An assembling machine of the class described, comprising a conveyer having a plurality of spaced recesses, said conveyer being intermittently movable to present the recesses successively at different stations, means at one station for feeding a pin to each recess as it reaches said station, means at a following station for applying a washer upon a pin as it reaches said station, a washer-forming means in proximity to the washer-applying station, and means for transferring a washer from its forming means to the washer-applying station whereat the washer is applied to the pin directly from the transferring means, the various operations being intermittently time-controlled.

12. An assembling machine of the class described, comprising means for seating a rubber washer within a cup on a valve pin after said washer is first applied upon the pin, said means comprising an element adapted to engage the top surface of the washer, and means for moving said element into the washer seating cup with a tamping action.

13. An assembling machine of the class described, comprising a conveyer having a plurality of spaced recesses, said conveyer being intermittently movable to present the recesses successively to different stations, means at one station for feeding a pin to each means as it reaches said station, means at a following station for applying a washer upon a pin as it reaches said station, means at a following station for seating an applied washer within a cup on the following pin, said last means comprising an element adapted to engage the top surface of the washer, and means for moving said element into the washer seating cup with a tamping action.

14. A machine of the class described, comprising a ferrule-forming mechanism and means for transferring a ferrule from its forming station to a distant station, said transfer means having a tubular element for receiving the formed ferrule, said transfer means being rotatably mounted upon an axis disposed at an angle to the axis of the tubular element therein, means for moving a formed ferrule from the forming means into the tubular recess in the transfer means, and means for rotating the transfer means through an arc of approximately 90°.

15. A machine of the class described, comprising a ferrule transfer means having a tubular recess of slightly larger diameter than the ferrule to receive said ferrule, and resilient means acting radially inwardly of said recess to hold said ferrule therein.

16. A machine of the class described, comprising means for transferring a ferrule from one station to a distant station, said transfer means having a tubular recess for receiving the ferrule, said transfer means being rotatably mounted upon an axis disposed at an angle to the axis of the tubular recess, and means for discharging the ferrule from the recess after the transfer means has been rotated, the movements of the various means being operatively time-controlled.

17. A machine of the class described, comprising means for transferring a ferrule from one station to a distant station, said transfer means including a tubular element in one end of which the ferrule is transported, means for moving the tubular element to position the ferrule carrying end thereof over a pin upon which the ferrule is to be applied, and a second means for engaging the ferrule to restrain its backward movement as the tubular element its retracted.

18. An assembling machine of the class described, comprising means for applying a ferrule upon a valve pin having a washer seated in a cup on said pin, said means being adapted to press the end of the ferrule into contact with the washer, and means for swaging the pin above the ferrule to hold said parts in assembled relation.

19. An assembling machine of the class described, comprising a conveyer adapted to receive valve pins, and means for presenting pins on said conveyer in intermittent timed relation to the following operating mechanisms at spaced apart stations, namely, means for feeding a pin to the conveyer, means for applying a washer to a pin, means for applying a ferrule to a pin over said washer, and means for operating on said assembled parts to prevent their separation.

20. An assembling machine of the class described, comprising a conveyer having a plurality of spaced recesses for receiving a valve pin having a cup mounted thereon, said conveyer being intermittently movable to present the recesses successively to spaced apart stations whereat the following mechanisms are operable; means for feeding a pin to each recess, means for applying a washer upon a pin, means for applying a ferrule to said pin over said washer, means for operating on said assembled parts to prevent their separation, and means for discharging the assembled units from the recesses, the various mechanisms being intermittently time-controlled.

21. A machine of the class described, comprising a conveyer adapted to receive pins, means for intermittently moving said conveyer to present the pins to a plurality of stations, mechanisms at said stations for operating upon said pins, and means at said stations for centering the pins and holding them so with respect to the operating mechanisms.

22. A machine of the class described, comprising a conveyer adapted to receive pins, means for intermittently moving said conveyer to present the pins to a plurality of stations, mechanisms at said stations for operating upon said pins, and means at said stations for centering the pins and holding them so with respect to the operating mechanisms, said centering means comprising a pair of pivotally-connected elements, the movements of which are cam-controlled.

23. A machine of the class described, comprising a conveyer adapted to receive pins, means for intermittently moving said conveyer to present the pins to a plurality of stations, mechanisms at said stations for operating upon said pins, and means at said stations for centering the pins and holding them so with respect to the operating mechanisms, said centering means comprising a pair of pivotally-connected elements, one having a surface against which a pin can roll, and the other having an angular recess within which the pin can seat.

24. A machine of the class described, comprising a conveyer adapted to receive pins, means for intermittently moving said conveyer to present the pins to a plurality of stations, mechanisms at said stations for operating upon said pins, and means at said stations for centering the pins and holding them so with respect to the operating mechanisms, said centering means comprising a cam-controlled link, to one end of which is pivotally connected a lever, the link and the lever having one a surface against which the pin can roll, and the other a V slot within which the pin can seat.

25. A machine of the class described, comprising a conveyer adapted to receive pins, means for intermittently moving said conveyer to present the pins to a plurality of stations, and means at one of said stations for centering and holding a pin, said means comprising a pair of oppositely-movable elements having jaws, the adjacent faces of which have means for engaging a pin.

26. A machine of the class described, comprising a conveyer adapted to receive pins, means for intermittently moving said conveyer to present the pins to a plurality of stations, and means at one of said stations for centering and holding a pin, said means comprising a pair of elements having cooperating jaws for engaging a pin, each of said elements having a rack in mesh with a common pinion, and the movement of one of said elements being cam-controlled.

27. An assembling machine of the class described, comprising means for seating a rubber washer within a cup on a valve pin, said means comprising a tubular element adapted to engage the top surface of the washer, means for moving the tubular element down over the valve pin into the washer seating cup, and means extending through the tubular element for engaging the top of the valve pin.

28. A machine of the class described, comprising ferrule-forming means having forming, piercing and blanking punches, and means for transferring a ferrule from its forming station to a distant station, said blanking punch also serving to transfer the blanked out ferrule from the forming means to the ferrule transfer means.

29. A machine of the class described, comprising means for transferring a ferrule from one station to a distant station, said transfer means including a tubular element, in one end of which the ferrule is transported, means for moving the tubular element to position the ferrule carrying end thereof over a pin upon which the ferrule is to be applied, a pin extending through the tubular element, and means for moving the pin to engage the ferrule on the pin while the tubular element is being retracted from the pin.

30. An assembling machine of the class described, comprising means for applying a ferrule upon a valve pin having a washer seated in a cup on said pin, said means being adapted to press the end of the ferrule into contact with the washer, means for holding the valve pin while the ferrule applying means is being withdrawn from the valve pin, and means for swaging the pin above the ferrule to hold said parts in assembled relation.

ARTHUR J. LEWIS.
JOHN W. RICHARDSON.
CHARLES JOHN SPILL.